US012358005B2

(12) United States Patent
Ishigami et al.

(10) Patent No.: US 12,358,005 B2
(45) Date of Patent: Jul. 15, 2025

(54) VOLTAGE APPLICATION DEVICE AND DISCHARGE DEVICE

(71) Applicant: PANASONIC INTELLECTUAL PROPERTY MANAGEMENT CO., LTD., Osaka (JP)

(72) Inventors: Yohei Ishigami, Osaka (JP); Kana Shimizu, Shiga (JP); Takafumi Omori, Shiga (JP); Yukari Nakano, Shiga (JP); Tetsunori Aono, Shiga (JP); Jumpei Oe, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 997 days.

(21) Appl. No.: 17/260,529

(22) PCT Filed: Jul. 25, 2019

(86) PCT No.: PCT/JP2019/029131
§ 371 (c)(1),
(2) Date: Jan. 14, 2021

(87) PCT Pub. No.: WO2020/044889
PCT Pub. Date: Mar. 5, 2020

(65) Prior Publication Data

US 2021/0268524 A1 Sep. 2, 2021

(30) Foreign Application Priority Data

Aug. 29, 2018 (JP) ................................ 2018-160762

(51) Int. Cl.

*B05B 5/00* (2006.01)
*B05B 5/025* (2006.01)
*B05B 5/057* (2006.01)

(52) U.S. Cl.
CPC ............ *B05B 5/0255* (2013.01); *B05B 5/007* (2013.01); *B05B 5/057* (2013.01)

(58) Field of Classification Search
CPC ......... B05B 5/006; B05B 5/007; B05B 5/057; B05B 5/0255
See application file for complete search history.

(56) References Cited

U.S. PATENT DOCUMENTS 4,897,667 A * 1/1990 Uchiyama .................. B41J 2/08 347/76
7,861,954 B2 * 1/2011 Akisada .................. B05B 5/057 239/707

(Continued)

FOREIGN PATENT DOCUMENTS

EP 3292915 A1 3/2018
JP 2006-122759 A 5/2006

(Continued)

OTHER PUBLICATIONS

International Search and Written Opinion issued in International Patent Application No. PCT/JP2019/029131, dated Sep. 3, 2019; with partial English translation.

(Continued)

*Primary Examiner* — Jason J Boeckmann
(74) *Attorney, Agent, or Firm* — Rimon P.C.

(57) ABSTRACT

Voltage application device includes voltage application circuit. Voltage application circuit causes discharge electrode to generate a discharge by applying an application voltage to load that includes discharge electrode holding liquid. Voltage application circuit periodically changes a magnitude of the application voltage to generate a discharge intermittently. Voltage application circuit applies a maintaining voltage to load for suppressing contraction of liquid in (Continued)

addition to the application voltage during an intermittent period from a discharge to a next discharge.

10 Claims, 9 Drawing Sheets

(56) References Cited

U.S. PATENT DOCUMENTS

| | | | | |
|---|---|---|---|---|
| 2010/0155496 | A1* | 6/2010 | Stark | B05B 5/047 239/3 |
| 2011/0126551 | A1* | 6/2011 | Uratani | B05B 5/057 239/690 |
| 2012/0006915 | A1 | 1/2012 | Suda et al. | |
| 2017/0173605 | A1* | 6/2017 | Tomoda | B05B 5/057 |
| 2018/0034248 | A1* | 2/2018 | Ishigami | H01T 23/00 |
| 2020/0353488 | A1 | 11/2020 | Ishigami et al. | |

FOREIGN PATENT DOCUMENTS

| | | | |
|---|---|---|---|
| JP | 2010-227808 | A | 10/2010 |
| JP | 2014-089857 | A | 5/2014 |
| JP | 2018-022574 | A | 2/2018 |
| WO | 2019/044272 | A1 | 3/2019 |

OTHER PUBLICATIONS

The Extended European Search Report dated Sep. 23, 2021 for the related European Patent Application No. 19855005.5.

* cited by examiner

VOLTAGE APPLICATION DEVICE AND DISCHARGE DEVICE

CROSS-REFERENCE OF RELATED APPLICATIONS

This application is the U.S. National Phase under 35 U.S.C. § 371 of International Patent Application No. PCT/JP2019/029131, filed on Jul. 25, 2019, which in turn claims the benefit of Japanese Application No. 2018-160762, filed on Aug. 29, 2018, the entire disclosures of which Applications are incorporated by reference herein.

TECHNICAL FIELD

The present disclosure generally relates to a voltage application device and a discharge device, and more particularly to a voltage application device and a discharge device each generating a discharge by applying a voltage to a load including a discharge electrode.

BACKGROUND ART

PTL 1 describes a discharge device including a discharge electrode, a counter electrode, and a voltage application unit. The counter electrode is located so as to face the discharge electrode. The voltage application unit applies a voltage to the discharge electrode to generate, in the discharge electrode, a discharge further developed from a corona discharge. In this configuration, the discharge of the discharge device is a discharge that intermittently generates a discharge path formed between the discharge electrode and the counter electrode and dielectrically broken so as to connect the two electrodes.

Moreover, in the discharge device described in PTL 1, a liquid is supplied to the discharge electrode by a liquid supply unit. Therefore, the liquid is electrostatically atomized by a discharge, and a nanometersized charged fine particle liquid containing radicals inside is generated.

In a discharge mode of the discharge device described in PTL 1, active components (radicals and charged fine particle liquid containing the radicals) are generated with higher energy in comparison with the corona discharge, a large amount of active components are generated in comparison with the corona discharge. Moreover, an amount of generated ozone is suppressed to an amount substantially equivalent to that of the corona discharge.

CITATION LIST

Patent Literature

PTL 1: Unexamined Japanese Patent Publication No. 2018-22574

SUMMARY OF THE INVENTION

However, in the discharge device described in PTL 1, for example, the liquid supplied to the discharge electrode may mechanically vibrate during electrostatic atomization depending on a usage environment or the like. In this case, sound may be generated.

The present disclosure provides a voltage application device and a discharge device capable of reducing sound generated by vibration of a liquid.

A voltage application device according to one aspect of the present disclosure includes a voltage application circuit.

The voltage application circuit causes a discharge electrode to generate a discharge by applying an application voltage to a load that includes a discharge electrode holding a liquid. The voltage application circuit periodically changes a magnitude of the application voltage to generate a discharge intermittently. The voltage application circuit applies a maintaining voltage for suppressing contraction of the liquid to the load in addition to the application voltage during an intermittent period from generation of a discharge to generation of a next discharge.

A discharge device according to one aspect of the present disclosure includes a discharge electrode and a voltage application circuit. The discharge electrode holds a liquid. The voltage application circuit applies a voltage to a load including a discharge electrode to generate a discharge in the discharge electrode. The voltage application circuit periodically changes a magnitude of the application voltage to generate a discharge intermittently. The voltage application circuit applies a maintaining voltage for suppressing contraction of the liquid to the load in addition to the application voltage during an intermittent period from generation of a discharge to generation of a next discharge.

The present disclosure offers an advantage that reduction of sound generated by vibration of a liquid is achievable.

DESCRIPTION OF EMBODIMENTS

First Exemplary Embodiment

(1) Overview

Figure 1:
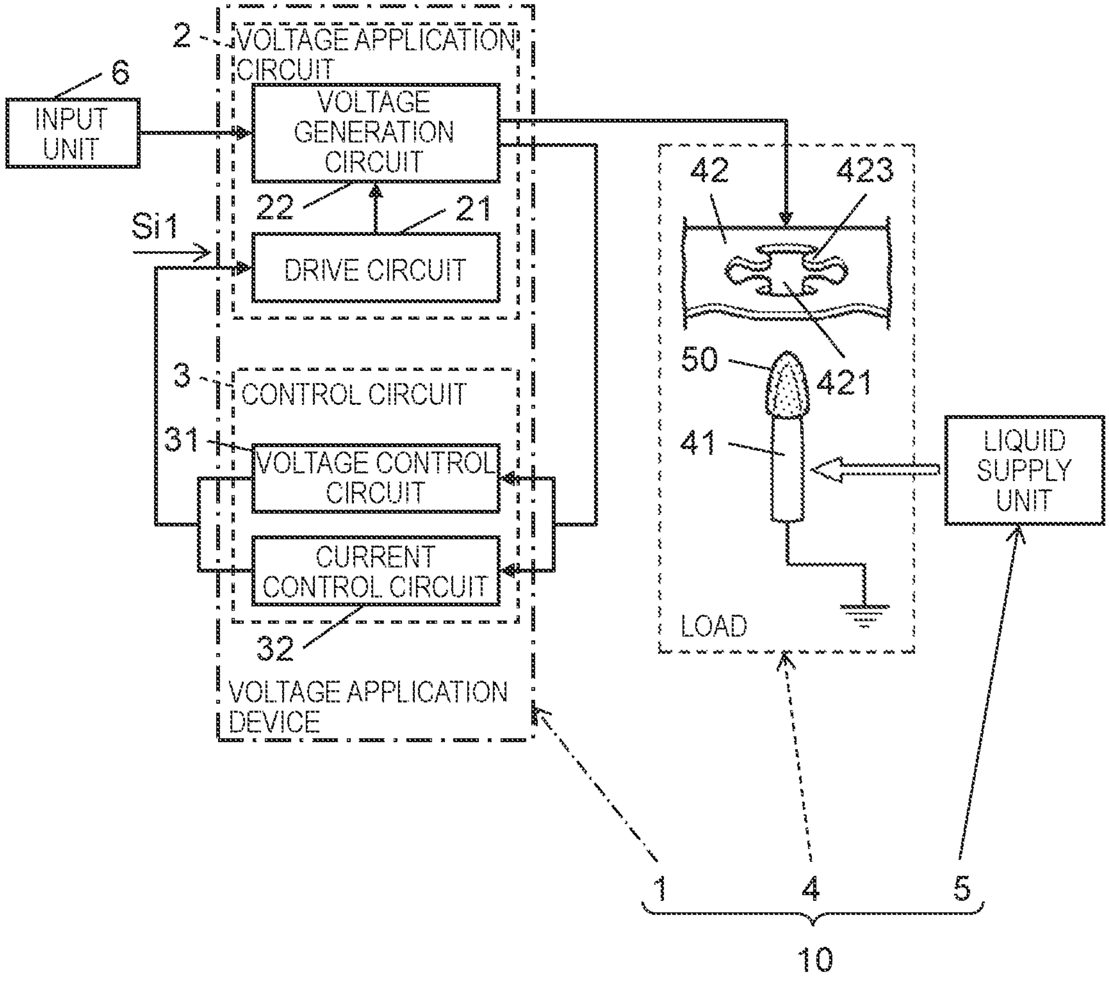
FIG. 1 is a block diagram of a discharge device according to a first exemplary embodiment.

As shown in FIG. 1, voltage application device 1 according to the present exemplary embodiment includes voltage application circuit 2 and control circuit 3. Voltage application device 1 applies a voltage to load 4 including discharge electrode 41 to generate a discharge in discharge electrode 41.

As shown in FIG. 1, discharge device 10 according to the present exemplary embodiment further includes voltage application device 1, load 4, and liquid supply unit 5. Load 4 has discharge electrode 41 and counter electrode 42. Counter electrode 42 is an electrode disposed so as to face discharge electrode 41 with a clearance left from discharge electrode 41. Load 4 generates a discharge between discharge electrode 41 and counter electrode 42 by applying a voltage between discharge electrode 41 and counter electrode 42. Liquid supply unit 5 has a function of supplying liquid 50 to discharge electrode 41. That is, discharge device 10 includes voltage application circuit 2, control circuit 3, liquid supply unit 5, discharge electrode 41, and counter electrode 42 as components. However, discharge device 10 is only required to include voltage application device 1 and discharge electrode 41 as minimum components, and each of counter electrode 42 and liquid supply unit 5 need not be included in the components of discharge device 10.

For example, discharge device 10 according to the present exemplary embodiment applies a voltage from voltage application circuit 2 to load 4 including discharge electrode 41 in a state where liquid 50 adheres to a surface of discharge electrode 41 to be held in discharge electrode 41. In this manner, a discharge is generated at least in discharge electrode 41, and liquid 50 held in discharge electrode 41 is electrostatically atomized by the discharge. That is, discharge device 10 according to the present exemplary embodiment constitutes a so-called electrostatic atomizer. In the present disclosure, liquid 50 held in discharge electrode 41, that is, liquid 50 to be electrostatically atomized is also simply referred to as "liquid 50".

Voltage application circuit 2 generates a discharge at least in discharge electrode 41 by applying an application voltage to load 4. Particularly in the present exemplary embodiment, voltage application circuit 2 intermittently generates a discharge by periodically changing a magnitude of the application voltage. Mechanical vibration is produced in liquid 50 in accordance with periodic changes of the application voltage. The "application voltage" used in the present disclosure refers to a voltage applied to load 4 by voltage application circuit 2 to generate a discharge. In the description of the present disclosure, a distinction is made between the "application voltage" for generating a discharge and a "maintaining voltage" described below. In the present exemplary embodiment, voltage application circuit 2 is controlled by control circuit 3. Accordingly, the magnitude of the application voltage described above is adjusted by control circuit 3.

Figure 2A:
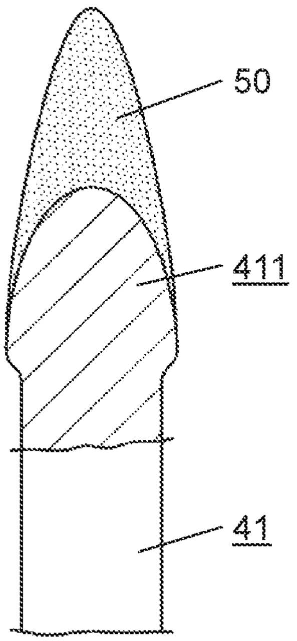
FIG. 2A is a schematic view showing an expanded state of a liquid held in a discharge electrode in the discharge device according to the first exemplary embodiment.

As will be described in detail below, when a voltage (application voltage) is applied to load 4, liquid 50 held in discharge electrode 41 receives force produced by an electric field, and forms a conical shape called Taylor cone as shown in FIG. 2A. Then, an electric field is concentrated on a tip portion (apex portion) of the Taylor cone. As a result, a discharge is generated. At this time, electric field intensity required for dielectric breakdown decreases as the tip portion of the Taylor cone becomes sharper, that is, an apex angle of the cone becomes smaller (acuter). In this case, a discharge is more likely to be generated. Liquid 50 held in discharge electrode 41 alternately is deformed into a shape shown in FIG. 2A and a shape shown in FIG. 2B in accordance with mechanical vibration. As a result, the Taylor cone as described above is formed periodically. Accordingly, a discharge is intermittently generated at the timing of formation of the Taylor cone as shown in FIG. 2A.

Figure 5A:
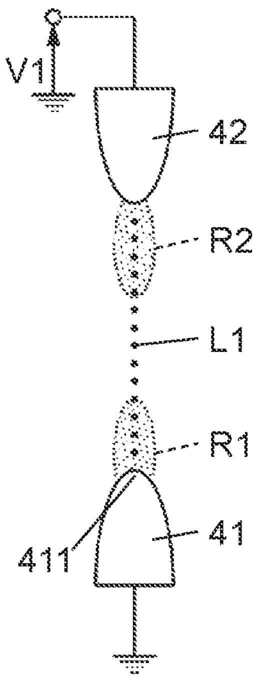
FIG. 5A is a schematic view showing a discharge mode of a partial breakdown discharge.

Meanwhile, in voltage application device 1 according to the present exemplary embodiment, voltage application circuit 2 applies application voltage V1 (see FIG. 5A) between discharge electrode 41 and counter electrode 42 disposed so as to face each other with a clearance left from each other to generate a discharge. At the time of generation of a discharge, voltage application device 1 forms partially and dielectrically broken discharge path L1 between discharge electrode 41 and counter electrode 42 as shown in FIG. 5A. Discharge path L1 includes first dielectric breakdown region R1 and second dielectric breakdown region R2. First dielectric breakdown region R1 is formed around discharge electrode 41. Second dielectric breakdown region R2 is formed around counter electrode 42.

That is, discharge path L1 dielectrically broken is formed between discharge electrode 41 and counter electrode 42 not entirely but partially (locally). The term "dielectric breakdown" used in the present disclosure refers to a state where an insulated condition is difficult to maintain as a result of breakage of electrical insulation of an insulator (including gas) that separates conductors. For example, gas dielectric breakdown is caused by a gas discharge generated by a rapid increase in an ion concentration produced when ionized molecules are accelerated by an electric field and collide with other gas molecules to be ionized. In short, when a discharge is generated by voltage application device 1 according to the present exemplary embodiment, dielectric breakdown is caused only partially, i.e., in a part in a gas (air) existing on a path connecting discharge electrode 41 and counter electrode 42. As described above, discharge path L1 formed between discharge electrode 41 and counter electrode 42 is a path not completely broken, but partially and dielectrically broken.

In addition, discharge path L1 includes first dielectric breakdown region R1 formed around discharge electrode 41, and second dielectric breakdown region R2 formed around counter electrode 42. That is, first dielectric breakdown region R1 is a region dielectrically broken around discharge electrode 41, while second dielectric breakdown region R2 is a region dielectrically broken around counter electrode 42. First dielectric breakdown region R1 and second dielectric breakdown region R2 are formed apart from each other so as not to come into contact with each other. Accordingly, discharge path L1 includes a region (insulation region) not dielectrically broken and formed at least between first dielectric breakdown region R1 and second dielectric breakdown region R2. Therefore, discharge path L1 formed between discharge electrode 41 and counter electrode 42 is in a state where electrical insulation has been lowered by generation of partial dielectric breakdown with an insulating region left at least partially.

According to voltage application device 1 and discharge device 10 described above, discharge path L1 dielectrically broken is formed not entirely but partially between discharge electrode 41 and counter electrode 42. Even in the case of discharge path L1 including a part dielectrically broken, in other words, discharge path L1 including a part not dielectrically broken as described above, a current flows through discharge path L1 between discharge electrode 41 and counter electrode 42. A discharge in a mode where discharge path L1 including a part dielectrically broken is formed as described above will be hereinafter referred to as "partial breakdown discharge". The partial breakdown discharge will be described in detail in a column of "(2.4) Discharge mode".

In the partial breakdown discharge described above, radicals are generated with higher energy in comparison with a corona discharge, and a large amount of radicals, which is about 2 to 10 times as large as an amount of radicals of the corona discharge, are generated. The radicals generated in this manner constitute a basis for exerting useful effects including not only sterilization, deodorization, moisturization, freshness, and virus inactivation, but also useful effects in various situations. Note herein that ozone is also generated when radicals are generated by a partial breakdown discharge. However, while the partial breakdown discharge generates approximately 2 to 10 times as many as radicals of the corona discharge, an amount of generated ozone is suppressed to a level similar to an amount of ozone in the corona discharge.

Moreover, apart from the partial breakdown discharge, there is such a discharge in a mode which intermittently repeats a phenomenon developing from a corona discharge to dielectric breakdown (complete breakdown). The discharge in this mode will be hereinafter referred to as "complete breakdown discharge"). In the complete breakdown discharge, following phenomena are repeated. A relatively large discharge current flows momentarily at the time of development from a corona discharge to dielectric breakdown (complete breakdown). Immediately after this phenomenon, an application voltage drops, and a discharge current is cut off. The application voltage again rises, and dielectric breakdown is caused. In the complete breakdown discharge, radicals are generated with higher energy in comparison with a corona discharge, and a large amount of radicals about 2 to 10 times as large as the amount of the corona discharge are generated, similarly to the partial breakdown discharge. However, energy of complete breakdown discharge is higher than energy of the partial breakdown discharge. Therefore, even if a large amount of radicals are generated in accordance with disappearance of ozone and an increase of radicals in a state of a "medium" energy level, the energy level becomes "high" in a subsequent reaction path. In this case, a part of radicals may disappear.

In other words, in the complete breakdown discharge, the energy associated with the discharge is extremely high. Accordingly, a part of the generated active components such as radicals (air ions, radicals, charged fine particle liquid containing radicals, and the like) disappear. In this case, formation efficiency of the active components may lower. Therefore, according to voltage application device 1 and discharge device 10 according to the present exemplary embodiment each adopting partial breakdown discharge, formation efficiency of the active components improves in comparison with the complete breakdown discharge. Therefore, voltage application device 1 and discharge device 10 according to the present exemplary embodiment offers an advantage of improvement of formation efficiency of active components such as radicals in comparison with any of the discharge modes of the corona discharge and the complete breakdown discharge.

Meanwhile, in voltage application device 1 according to the present exemplary embodiment, voltage application circuit 2 applies application voltage V1 (see FIG. 5A) to load 4 including discharge electrode 41 which holds liquid 50 to generate a discharge in discharge electrode 41. Voltage application circuit 2 periodically changes the magnitude of application voltage V1 to generate a discharge intermittently. Voltage application circuit 2 applies maintaining voltage V2 (see FIG. 6) for suppressing contraction of liquid 50 to load 4 during intermittent period T2 (see FIG. 6) from generation of a discharge to a next discharge in addition to application voltage V1.

In other words, in the present exemplary embodiment, voltage application circuit 2 intermittently generates a discharge by periodically changing the magnitude of application voltage V1. As a result, liquid 50 held in discharge electrode 41 periodically expands and contracts (see FIGS. 2A and 2B), and mechanical vibration is produced in liquid 50. When liquid 50 excessively contracts after generation of the discharge in accordance with the foregoing mechanical vibration of liquid 50, amplitude of the mechanical vibration of liquid 50 excessively increases. In this case, sound produced by the vibration of liquid 50 may increase.

In addition, in intermittent period T2, maintaining voltage V2 is applied to load 4 in addition to application voltage V1 applied to load 4 by voltage application circuit 2 to generate a discharge. Accordingly, the voltage applied to load 4 is raised by the amount of maintaining voltage V2. As a result, excessive contraction of liquid 50 described above after generation of the discharge is suppressed by using maintaining voltage V2 to thereby lower the possibility of sound produced by vibration of liquid 50. Accordingly, voltage application device 1 and discharge device 10 of the present exemplary embodiment offers an advantage of reduction of sound produced by vibration of liquid 50.

(2) Details

Voltage application device 1 and discharge device 10 according to the present exemplary embodiment will be hereinafter described in more detail.

(2.1) Overall Configuration

As shown in FIG. 1, discharge device 10 according to the present exemplary embodiment includes voltage application circuit 2, control circuit 3, load 4, and liquid supply unit 5.

Load 4 has discharge electrode 41 and counter electrode 42. Liquid supply unit 5 supplies liquid 50 to discharge electrode 41. FIG. 1 schematically shows shapes of discharge electrode 41 and counter electrode 42.

Discharge electrode 41 is a rod-shaped electrode. Discharge electrode 41 has tip portion 411 (see FIG. 3B) at one end in a longitudinal direction, and base end portion 412 (see FIG. 3B) at the other end in the longitudinal direction (the end portion opposite to the tip portion). Discharge electrode 41 is a needle electrode which has a tapered shape at least at tip portion 411. The "tapered shape" herein is not limited to a shape having a sharp tip, but also includes a shape having a rounded tip as shown in FIG. 2A and other figures.

Counter electrode 42 is disposed so as to face the tip portion of discharge electrode 41. For example, counter electrode 42 has a plate shape, and has opening 421 at a central portion. Opening 421 penetrates counter electrode 42 in a thickness direction of counter electrode 42. A positional relationship between counter electrode 42 and discharge electrode 41 is herein determined such that a thickness direction of counter electrode 42 (penetration direction of opening 421) coincides with the longitudinal direction of discharge electrode 41, and that the tip portion of discharge electrode 41 is located near a center of the opening 421 of counter electrode 42. That is, a clearance (space) is secured between counter electrode 42 and discharge electrode 41 by at least opening 421 of counter electrode 42. In other words, counter electrode 42 is disposed so as to face discharge electrode 41 with a clearance left therebetween, and is electrically insulated from discharge electrode 41.

Figure 3A:
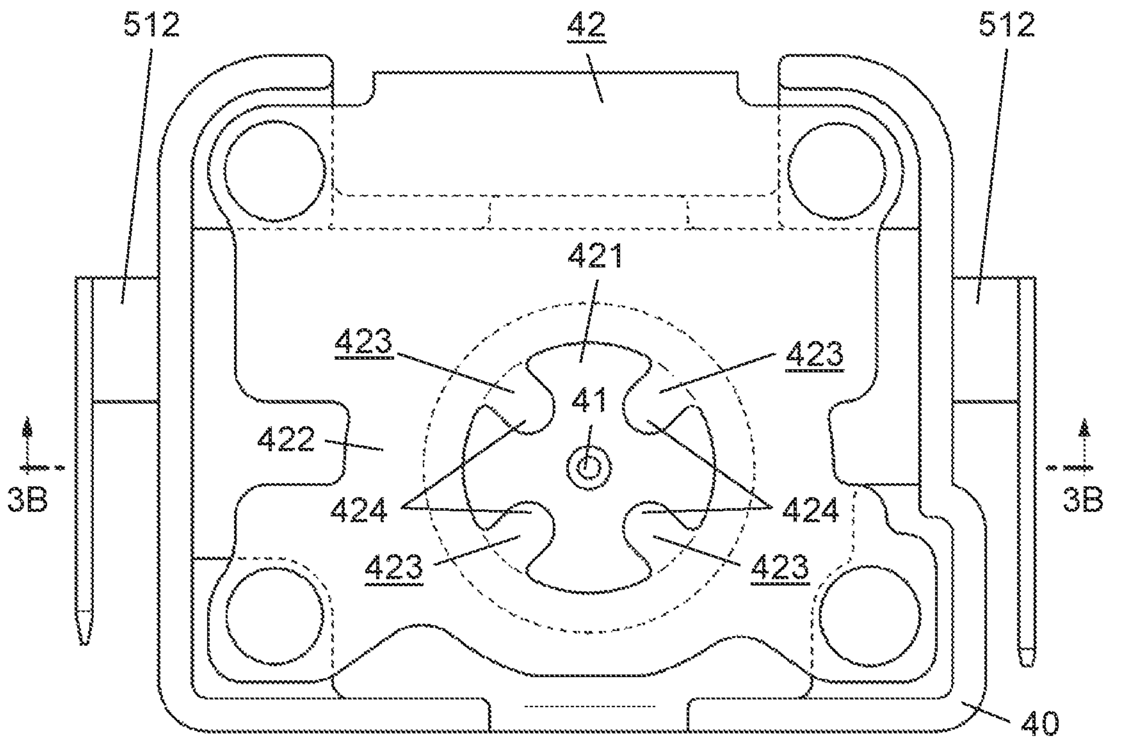
FIG. 3A is a plan view showing a specific example of the discharge electrode and a counter electrode in the discharge device according to the first exemplary embodiment.
Figure 3B:
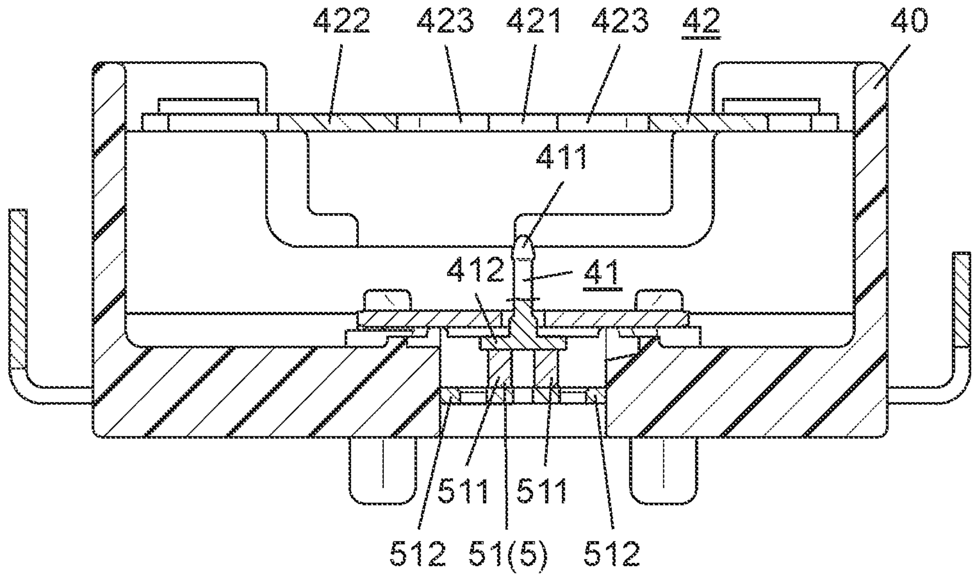
FIG. 3B is a sectional view taken along line 3B-3B of FIG. 3A.

More specifically, discharge electrode 41 and counter electrode 42 have shapes shown in FIGS. 3A and 3B by way of example. That is, counter electrode 42 has support portion 422 and a plurality of (four in this example) projecting portions 423. Each of the plurality of projecting portions 423 projects from supporting portion 422 toward discharge electrode 41. Discharge electrode 41 and counter electrode 42 are held in housing 40 made of synthetic resin having an electrical insulation property. Support portion 422 has a flat plate shape, and has opening 421 that opens in a circular shape. In FIG. 3A, an inner peripheral edge of opening 421 is indicated by an imaginary line (two-dot chain line). Note that opening 421 is shown by an imaginary line (two-dot chain line) also in each of FIGS. 4A and 4B referred to below.

Four projecting portions 423 are disposed at equal intervals in a circumferential direction of opening 421. Each of projecting portions 423 projects from an inner peripheral edge of opening 421 in support portion 422 toward the center of opening 421. Each of projecting portions 423 has extension portion 424 having a tapered shape at a tip portion in the longitudinal direction (an end portion of opening 421 on the central side). In the present exemplary embodiment, each of support portion 422 and a plurality of projecting portions 423 of counter electrode 42 forms a flat plate shape as a whole. That is, each of projecting portions 423 projects straight toward the center of opening 421 from the inner peripheral edge of opening 421 formed in support portion 422 without tilting in the thickness direction of support portion 422 so as to fit between both sides of flat-shaped support portion 422 in the thickness direction. This shape of each of projecting portions 423 easily causes electric field concentration at extension portion 424 of each of projecting portions 423. As a result, a partial breakdown discharge is likely to be generated in a stable manner between extension portion 424 of each of projecting portions 423 and tip portion 411 of discharge electrode 41.

Further, as shown in FIG. 3A, discharge electrode 41 is located at the center of the opening 421 in a plan view, that is, when viewed from one side of discharge electrode 41 in the longitudinal direction. In other words, discharge electrode 41 is located at a center point of an inner circumferential edge of opening 421 in the plan view. Further, as shown in FIG. 3B, discharge electrode 41 and counter electrode 42 are in such a positional relationship as to be separated from each other even in the longitudinal direction of discharge electrode 41 (the thickness direction of counter electrode 42). That is, tip portion 411 is located between base end portion 412 and counter electrode 42 in the longitudinal direction of discharge electrode 41.

More specific shapes of discharge electrode 41 and counter electrode 42 will be described in a column of "(2.3) Electrode shape".

Liquid supply unit 5 supplies liquid 50 for electrostatic atomization to discharge electrode 41. For example, liquid supply unit 5 is implemented by using cooling device 51 that cools discharge electrode 41 and generates dew condensation water from discharge electrode 41. Specifically, cooling device 51, which is liquid supply unit 5, includes a pair of Peltier elements 511 and a pair of heat radiating plates 512 as shown in FIG. 3B, for example. The pair of Peltier elements 511 are held by the pair of heat radiating plates 512. Cooling device 51 cools discharge electrode 41 by energizing the pair of Peltier elements 511. A part of each of heat radiating plates 512 is embedded in housing 40 to hold the pair of heat radiating plates 512 in housing 40. At least a portion holding Peltier element 511 in each of the pair of heat radiating plates 512 is exposed from housing 40.

The pair of Peltier elements 511 are mechanically and electrically connected to base end portion 412 of discharge electrode 41 by soldering, for example. The pair of Peltier elements 511 are mechanically and electrically connected to the pair of heat radiating plates 512, for example, by soldering. Energization of the pair of Peltier elements 511 is performed through the pair of heat radiating plates 512 and discharge electrode 41. Therefore, cooling device 51 constituting liquid supply unit 5 cools entire discharge electrode 41 through base end portion 412. As a result, moisture in the air condenses and adheres to a surface of discharge electrode 41 as condensed water. That is, liquid supply unit 5 is configured to cool discharge electrode 41, and generate condensed water as liquid 50 on the surface of discharge electrode 41. In this configuration, liquid supply unit 5 can supply liquid 50 (condensed water) to discharge electrode 41 by using moisture in the air. Accordingly, the necessity of supplying and replenishing the liquid to discharge device 10 is eliminated.

As shown in FIG. 1, voltage application circuit 2 includes drive circuit 21 and voltage generation circuit 22. Drive circuit 21 is a circuit that drives voltage generation circuit 22. Voltage generation circuit 22 is a circuit that receives power supplied from input unit 6, and generates voltages to be applied to load 4 (application voltage and maintaining voltage). Input unit 6 is a power supply circuit that generates a DC voltage of approximately several V to a dozen of V. In the description of the present exemplary embodiment, it is assumed that input unit 6 is not included in the components of voltage application device 1. However, input unit 6 may be included in the components of voltage application device 1.

For example, voltage application circuit 2 is an isolated DC/DC converter that boosts input voltage Vin (for example, 13.8 V) received from input unit 6, and outputs the boosted voltage as an output voltage. The output voltage of voltage application circuit 2 is applied to load 4 (discharge electrode 41 and counter electrode 42) as at least one of the application voltage and the maintaining voltage.

Voltage application circuit 2 is electrically connected to load 4 (discharge electrode 41 and counter electrode 42). Voltage application circuit 2 applies a high voltage to load 4. Voltage application circuit 2 herein is configured to apply a high voltage between discharge electrode 41 and counter electrode 42 while designating discharge electrode 41 as a negative electrode (ground) and counter electrode 42 as a positive electrode (plus). In other words, in a state where a high voltage is applied from voltage application circuit 2 to load 4, a potential difference is produced between discharge electrode 41 on the high potential side and counter electrode 42 on the low potential side. The "high voltage" herein may be any voltage set so as to cause a partial breakdown discharge in discharge electrode 41, such as a voltage having a peak of approximately 5.0 kV. However, the high voltage applied from voltage application circuit 2 to load 4 is not limited to approximately 5.0 kV, and is appropriately set in accordance with shapes of discharge electrode 41 and counter electrode 42, a distance between discharge electrode 41 and counter electrode 42, or the like, for example.

Operation modes of voltage application circuit 2 herein include two modes, i.e., a first mode and a second mode. The first mode is a mode for increasing application voltage V1 in accordance with an elapse of time to form discharge path L1 developed from a corona discharge and partially and dielectrically broken, and to consequently generate a discharge current. The second mode is a mode for cutting off the discharge current using control circuit 3 or the like in an overcurrent state of load 4. The "discharge current" in the present disclosure refers to a relatively large current flowing through discharge path L1, and does not include a minute current of approximately several μA generated in a corona discharge before discharge path L1 is formed. The "overcurrent state" in the present disclosure refers to a state where a current of an assumed value or more flows through load 4 as a result of a drop of the load by a discharge.

According to the present exemplary embodiment, control circuit 3 controls voltage application circuit 2. Control circuit 3 controls voltage application circuit 2 such that voltage application circuit 2 alternately repeats the first mode and the second mode during a drive period for driving voltage application device 1. Control circuit 3 herein switches between the first mode and the second mode at a drive frequency such that the magnitude of application voltage V1 applied from voltage application circuit 2 to load 4 periodically changes at the drive frequency. The "drive period" in the present disclosure is a period in which voltage application device 1 is driven so as to generate a discharge in discharge electrode 41.

That is, voltage application circuit 2 does not keep the magnitude of the voltage applied to load 4 including discharge electrode 41 at a fixed value, but periodically changes the voltage at the drive frequency within a predetermined range. Voltage application circuit 2 generates a discharge intermittently by periodically changing the magnitude of application voltage V1. That is, discharge path L1 is periodically formed in accordance with a change cycle of application voltage V1, and a discharge is periodically generated. Hereinafter, the cycle in which a discharge (partial breakdown discharge) is generated will be also referred to as a "discharge cycle". In this case, a magnitude of electrical energy acting on liquid 50 held in discharge electrode 41 changes periodically at the drive frequency. As a result, liquid 50 held in discharge electrode 41 mechanically vibrates at the drive frequency.

For increasing a deformation amount of liquid 50, it is preferable that the drive frequency, which is a frequency of changes of application voltage V1, is set to a value within a predetermined range including a resonance frequency (natural frequency) of liquid 50 held in discharge electrode 41, i.e., a value near the resonance frequency of liquid 50. The "predetermined range" in the present disclosure is a frequency range in which the mechanical vibration of liquid 50 is amplified when force (energy) applied to liquid 50 at that frequency is vibrated, and also is a range in which a lower limit value and an upper limit value are defined with respect to the resonance frequency of liquid 50. That is, the drive frequency is set to a value near the resonance frequency of liquid 50. In this case, the amplitude of the mechanical vibration of liquid 50 produced by changes of the magnitude of application voltage V1 is relatively large, and therefore the deformation amount of liquid 50 caused by the mechanical vibration of liquid 50 increases. The resonance frequency of liquid 50 depends on a volume (amount), surface tension, viscosity, and the like of liquid 50, for example.

That is, in discharge device 10 according to the present exemplary embodiment, liquid 50 vibrates with relatively large amplitude by mechanically vibrating liquid 50 at a drive frequency near the resonance frequency of liquid 50. In this case, a tip portion (top portion) of a Taylor cone formed when an electric field acts has a sharper (acute) shape. Accordingly, as compared with a case where liquid 50 mechanically vibrates at a frequency away from the resonance frequency of liquid 50, electric field intensity required for dielectric breakdown in a state of presence of the Taylor cone decreases, and a discharge is more likely to be generated. Therefore, a discharge (partial breakdown discharge) can be stably generated even if there are produced variations in the magnitude of the voltage (application voltage V1) applied from voltage application circuit 2 to load 4, variations in the shape of discharge electrode 41, or variations in the quantity (volume) of liquid 50 supplied to discharge electrode 41, for example. Moreover, voltage application circuit 2 can reduce the magnitude of the voltage applied to load 4 including discharge electrode 41 to a relatively low voltage. Therefore, a structure for insulation measures around discharge electrode 41 can be simplified, and a withstand voltage of components included in voltage application circuit 2 and the like can be lowered.

Meanwhile, according to the present exemplary embodiment, voltage application circuit 2 applies maintaining voltage V2 (see FIG. 6) for suppressing contraction of liquid 50 to load 4 during intermittent period T2 (see FIG. 6) from generation of a discharge to a next discharge in addition to application voltage V1. In other words, in the present exemplary embodiment, voltage application circuit 2 intermittently generates a discharge by periodically changing the magnitude of application voltage V1. Therefore, discharge path L1 is not formed in a period from generation of a discharge to next generation of a discharge. Accordingly, intermittent period T2 in which a discharge current does not flow is produced. It is assumed herein by way of example that a period in which voltage application circuit 2 operates in the second mode in discharge cycle T1 (see FIG. 6) is defined as intermittent period T2. Specifically, in intermittent period T2, maintaining voltage V2 is applied to load 4 in addition to application voltage V1 applied to load 4 by voltage application circuit 2 to generate a discharge. Accordingly, the voltage applied to load 4 is raised by the amount of maintaining voltage V2. In other words, a sum of voltages (V1+V2) of application voltage V1 and maintaining voltage V2 is applied to load 4. In this case, in intermittent period T2, the voltage applied to load 4 gradually decreases with an elapse of time, but an amount of decrease is reduced by the amount of maintaining voltage V2.

As a result, voltage application device 1 and discharge device 10 of the present exemplary embodiment achieve reduction of sound produced by vibration of liquid 50. Details of measures against sound using maintaining voltage V2 will be explained in a column "(2.5) Measures against sound".

As described above, voltage application circuit 2 applies maintaining voltage V2 for suppressing contraction of liquid 50 to load 4 in addition to application voltage V1. In this case, the voltage applied from voltage application circuit 2 to load 4 apparently increases. Therefore, application of maintaining voltage V2 is achieved by changing an output voltage from voltage application circuit 2. Specifically, application of maintaining voltage V2 is achieved by changing the output voltage from voltage application circuit 2 based on adjustment of circuit constants (resistance values, capacitance values, or the like) of control circuit 3 (voltage control circuit 31), drive circuit 21, and voltage generation circuit 22. Moreover, the configuration of changing the circuit constants is not required to be adopted. For example, application of maintaining voltage V2 may be achieved by changing the output voltage from voltage application circuit 2 based on adjustment of parameters or the like used in a microcomputer included in control circuit 3.

In the present exemplary embodiment, control circuit 3 controls voltage application circuit 2 based on a monitored target. The "monitoring target" herein is constituted by at least either the output current or the output voltage of voltage application circuit 2.

Control circuit 3 herein includes voltage control circuit 31 and current control circuit 32. Voltage control circuit 31 controls drive circuit 21 of voltage application circuit 2 based on the monitoring target constituted by the output voltage of voltage application circuit 2. Control circuit 3 outputs control signal Si1 (see FIG. 1) to drive circuit 21, and controls drive circuit 21 using control signal Si1. Current control circuit 32 controls drive circuit 21 of voltage application circuit 2 based on the monitoring target constituted by the output current of voltage application circuit 2. That is, in the present exemplary embodiment, control circuit 3 controls voltage application circuit 2 by monitoring both the output current and the output voltage of voltage application circuit 2 as monitoring targets. However, there is a correlation between the output voltage (secondary side voltage) of voltage application circuit 2 and a primary side voltage of voltage application circuit 2. Accordingly, voltage control circuit 31 may indirectly detect the output voltage of voltage application circuit 2 from the primary side voltage of voltage application circuit 2. Similarly, there is a correlation between the output current (secondary side current) of voltage application circuit 2 and an input current (primary side current) of voltage application circuit 2. Accordingly, current control circuit 32 may indirectly detect the output current of voltage application circuit 2 from the input current of voltage application circuit 2.

Control circuit 3 is configured to operate voltage application circuit 2 in the first mode when the magnitude of the monitoring target is less than a threshold value. On the other hand, control circuit 3 is configured to operate voltage application circuit 2 in the second mode when the magnitude of the monitoring target is more than or equal to the threshold value. That is, voltage application circuit 2 operates in the first mode until the magnitude of the monitoring target reaches the threshold value, and application voltage V1 increases with an elapse of time. At this time, discharge path L1 developed from a corona discharge and partially and dielectrically broken is formed, and a discharge current is generated in discharge electrode 41. When the magnitude of the monitoring target reaches the threshold value, voltage application circuit 2 operates in the second mode. As a result, application voltage V1 decreases. At this time, load 4 comes into an overcurrent state, and the discharge current is cut off by control circuit 3 or the like. In other words, control circuit 3 or the like detects the overcurrent state of load 4 via voltage application circuit 2, and reduces the application voltage to extinguish the discharge current (into disappearance).

In this manner, during the drive period, voltage application circuit 2 operates so as to alternately repeat the first mode and the second mode, and the magnitude of application voltage V1 periodically changes at the drive frequency. As a result, a discharge (partial breakdown discharge) in a mode where a phenomena of formation of discharge path L1 developed from a corona discharge and partially and dielectrically broken is intermittently repeated in discharge electrode 41. That is, discharge device 10 intermittently forms discharge path L1 around discharge electrode 41 by partial breakdown discharge, and repeatedly generates a pulsed discharge current.

Further, discharge device 10 according to the present exemplary embodiment applies a voltage from voltage application circuit 2 to load 4 in a state where liquid 50 (condensation water) is supplied (held) to discharge electrode 41. As a result, a discharge (partial breakdown discharge) is generated in load 4 between discharge electrode 41 and counter electrode 42 by a potential difference between discharge electrode 41 and counter electrode 42. At this time, liquid 50 held in discharge electrode 41 is electrostatically atomized by the discharge. As a result, discharge device 10 produces a nanometer-sized charged fine particle liquid containing radicals. The produced charged fine particle liquid is released to a periphery of discharge device 10 via opening 421 of counter electrode 42, for example.

(2.2) Operation

According to discharge device 10 having the configuration described above, control circuit 3 operates in following manners to generate a partial breakdown discharge between discharge electrode 41 and counter electrode 42.

Specifically, control circuit 3 monitors the output voltage of voltage application circuit 2 in a period until discharge path L1 (see FIG. 5A) is formed as a monitoring target. When the monitoring target (output voltage) becomes more than or equal to maximum value a (see FIG. 6), voltage control circuit 31 reduces energy input to voltage generation circuit 22. On the other hand, after discharge path L1 is formed, control circuit 3 monitors the output current of voltage application circuit 2 as a monitoring target. When the monitoring target (output current) becomes more than or equal to a threshold value, current control circuit 32 reduces energy input to voltage application circuit 22. In this manner, the voltage applied to load 4 is reduced to bring load 4 into an overcurrent state, and voltage application circuit 2 operates in the second mode for cutting off a discharge current. That is, the operation mode of voltage application circuit 2 is switched from the first mode to the second mode.

At this time, both the output voltage and the output current of voltage application circuit 2 decrease. Therefore, control circuit 3 restarts the operation of drive circuit 21. As a result, the voltage applied to load 4 rises with an elapse of time, and discharge path L1 developed from a corona discharge and partially dielectrically broken is formed.

After current control circuit 32 is activated herein, an increase rate of the output voltage of voltage application circuit 2 is determined by an influence of current control circuit 32. In short, in the example of FIG. 6, an amount of change in the output voltage of voltage application circuit 2 per unit time in discharge cycle T1 is determined by a time constant of an integration circuit in current control circuit 32, for example. In other words, discharge cycle T1 is determined by the circuit constant of current control circuit 32, for example, because maximum value a is a fixed value.

During the drive period, control circuit 3 repeats the above-described operation. Accordingly, voltage application circuit 2 operates in such a manner as to alternately repeat the first mode and the second mode. As a result, a magnitude of electrical energy acting on liquid 50 held in discharge electrode 41 changes periodically at the drive frequency. Accordingly, liquid 50 mechanically vibrates at the drive frequency.

Figure 2B:
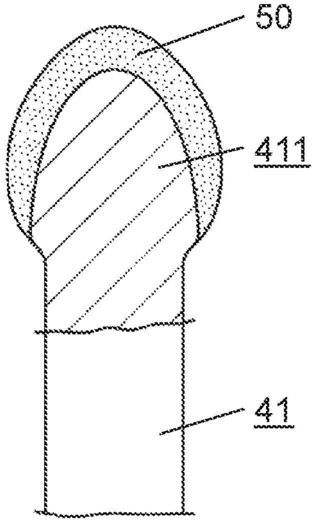
FIG. 2B is a schematic view showing a contracted state of the liquid held in the discharge electrode in a first discharge device.

In short, when a voltage is applied from voltage application circuit 2 to load 4 including discharge electrode 41, force produced by an electric field acts on liquid 50 held in discharge electrode 41 and deforms liquid 50. At this time, force F1 acting on liquid 50 held by discharge electrode 41 is represented by the product of an amount of charge q1 contained in liquid 50 and electric field E1 (F1=q1×E1). Particularly in the present exemplary embodiment, a voltage is applied between counter electrode 42 facing tip portion 411 of discharge electrode 41 and discharge electrode 41. Accordingly, force pulling liquid 50 toward counter electrode 42 by the electric field acts on liquid 50. As a result, as shown in FIG. 2A, liquid 50 held at tip portion 411 of discharge electrode 41 receives force produced by the electric field, and expands toward counter electrode 42 in a direction where discharge electrode 41 and counter electrode 42 faces to form a conical shape called a Taylor cone. When the voltage applied to load 4 decreases from the state shown in FIG. 2A, the force acting on liquid 50 by the influence of the electric field also decreases. In this case, liquid 50 is deformed. As a result, as shown in FIG. 2B, liquid 50 held at tip portion 411 of discharge electrode 41 contracts in the direction where discharge electrode 41 and counter electrode 42 face each other.

Then, the magnitude of the voltage applied to load 4 periodically changes at the drive frequency. Accordingly, liquid 50 held in discharge electrode 41 is alternately deformed into a shape shown in FIG. 2A and a shape shown in FIG. 2B. A discharge is generated by concentration of the electric field on the tip portion (apex portion) of the Taylor cone. In this case, dielectric breakdown is caused in a state where the tip portion of the Taylor cone is sharp as shown in FIG. 2A. Therefore, a discharge (partial breakdown discharge) is intermittently caused in accordance with the drive frequency.

Meanwhile, when the drive frequency increases, that is, discharge cycle T1 becomes shorter, an amount of ozone generated when radicals are generated by a partial breakdown discharge may increase. Specifically, time intervals at the time of generation of the discharge become shorter as the drive frequency increases. In this case, a number of times of generation of the discharge per unit time (for example, 1 second) increases, and the amount of radicals and ozone generated per unit time may increase. There are following two means for suppressing the increase in the amount of ozone generated per unit time due to the increase in the driving frequency.

The first means is to lower maximum value a of application voltage V1. Specifically, maximum value a of the application voltage during the drive period is adjusted to be less than or equal to a specified voltage value such that the amount of ozone generated per unit time by the discharge generated in discharge electrode 41 during the drive period becomes less than or equal to the specified value. By lowering maximum value a of application voltage V1 to less than or equal to the specified voltage value, the amount of ozone generated when radicals are generated by the partial breakdown discharge is suppressed. Accordingly, an increase in the amount of ozone generated in accordance with an increase in the drive frequency can be suppressed.

The second means is to increase a volume of liquid 50 held in discharge electrode 41. Specifically, the volume of liquid 50 during the drive period is adjusted to be more than or equal to a specified volume such that the amount of ozone generated per unit time by the discharge generated in discharge electrode 41 during the drive period becomes less than or equal to the specified value. By increasing the volume of liquid 50 held in discharge electrode 41, the amount of ozone generated when radicals are generated by a partial breakdown discharge is suppressed. Accordingly, an increase in the amount of ozone generated in accordance with an increase in the drive frequency can be suppressed.

In discharge device 10 according to the present exemplary embodiment, the increase in the amount of ozone generated per unit time is suppressed by adopting the first means, that is, by lowering maximum value a of the application voltage during the drive period. In this manner, discharge device 10 can suppress an ozone concentration to approximately 0.02 ppm, for example. However, discharge device 10 may adopt the second means, or may adopt both the first means and the second means.

(2.3) Electrode Shape

Figure 4A:
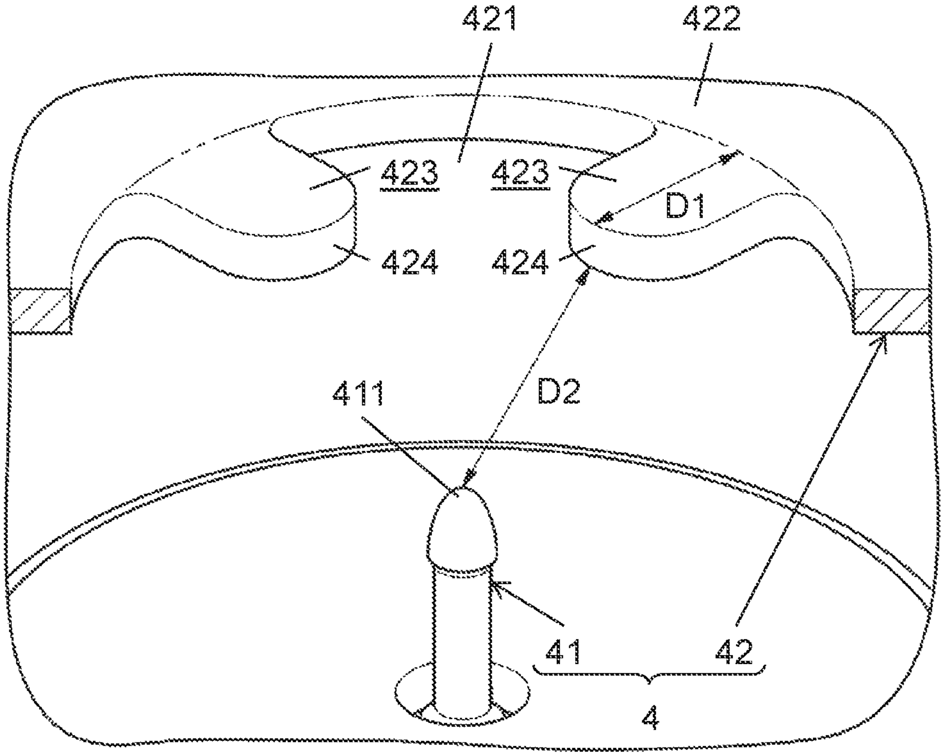
FIG. 4A is a partially broken perspective view schematically showing a main part of the discharge electrode and the counter electrode in the discharge device according to the first exemplary embodiment.
Figure 4B:
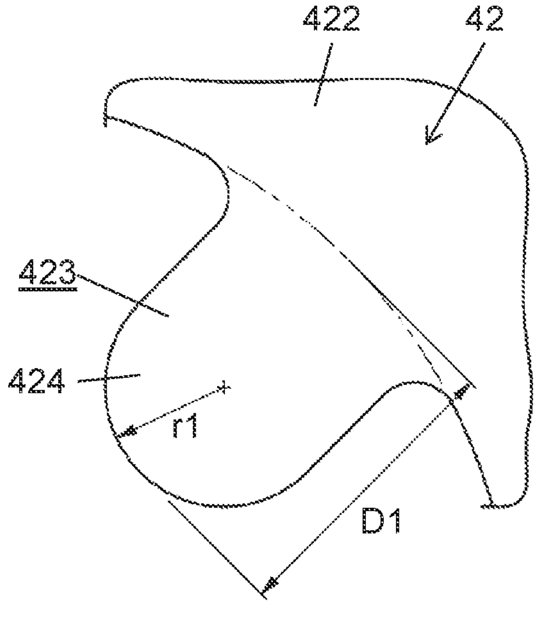
FIG. 4B is a plan view schematically showing a main part of the counter electrode in the discharge device according to the first exemplary embodiment.
Figure 4C:
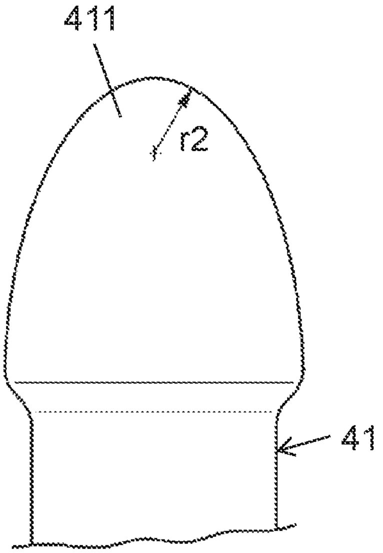
FIG. 4C is a front view schematically showing a main part of the discharge electrode in the discharge device according to the first exemplary embodiment.

Next, more detailed shapes of discharge electrode 41 and counter electrode 42, which are electrodes included in discharge device 10 according to the present exemplary embodiment, will be described with reference to FIGS. 4A to 4C. FIGS. 4A to 4C each schematically show main parts of discharge electrode 41 and counter electrode 42 constituting load 4, and omit illustration of configurations other than discharge electrode 41 and counter electrode 42 as appropriate.

Specifically, in the present exemplary embodiment, counter electrode 42 has support portion 422, and one or more (four in this example) projecting portions 423 projecting from support portion 422 toward discharge electrode 41 as described above. As shown in FIG. 4A, projection amount D1 of each of projecting portions 423 from support portion 422 herein is preferably smaller than distance D2 between discharge electrode 41 and counter electrode 42. Furthermore, it is more preferable that projection amount D1 of each of projecting portions 423 is less than or equal to ⅔ of distance D2 between discharge electrode 41 and counter electrode 42. That is, it is preferable to satisfy a relational expression "D1≤D2×⅔". "Projection amount D1" herein refers to a longest distance in distances from an inner peripheral edge of opening 421 to a tip of projecting portion 423 in the longitudinal direction of projecting portion 423 (see FIG. 4B). In addition, "distance D2" herein refers to a shortest distance (space distance) in distances from tip portion 411 of discharge electrode 41 to each of projecting portions 423 of counter electrode 42. In other words, "distance D2" is the shortest distance from extension portion 424 of each of projecting portions 423 to discharge electrode 41.

For example, in a case where distance D2 between discharge electrode 41 and counter electrode 42 is 3.0 mm or more and less than 4.0 mm, the above relationship formula will be satisfied if projection amount D1 of each of projecting portions 423 from support portion 422 is 2.0 mm or less. When projection amount D1 of each of projecting portions 423 is relatively short compared to distance D2 between discharge electrode 41 and counter electrode 42 as described above, the concentration of the electric field at projecting portions 423 can be reduced. In this case, a partial breakdown discharge is easily generated.

In the present exemplary embodiment, projection amount D1 and distance D2 are equalized in all of the plurality of (four in this example) projecting portions 423. In other words, any one of the plurality of projecting portions 423 has projection amount D1 equal to projection amount D1 of other three projecting portions 423. In addition, any one of the plurality of projecting portions 423 has same distance D2 to discharge electrode 41 as those of other three projecting portions 423. That is, the distances from all of projecting portions 423 to discharge electrode 41 are equalized.

Further, a tip surface of each of projecting portions 423 includes a curved surface as shown in FIG. 4B. In the present exemplary embodiment, each of projecting portions 423 has extension portion 424 having a tapered shape as described above, a tip surface of extension portion 424, that is, a surface facing the center of opening 421 includes a curved surface. The tip surface of projecting portion 423 herein is formed into a semicircular shape continuously connected from a side surface of projecting portion 423 in a plan view, and does not include a corner. That is, the entire tip surface of projecting portion 423 is a curved surface (bent surface).

On the other hand, a tip surface of discharge electrode 41 also includes a curved surface as shown in FIG. 4C. In the present exemplary embodiment, discharge electrode 41 has tip portion 411 having a tapered shape as described above, the tip surface of tip portion 411, that is, the surface facing opening 421 of counter electrode 42 includes a curved surface. The tip surface of discharge electrode 41 herein is formed such that a cross-sectional shape including a center axis of discharge electrode 41 has an arc shape continuously connected from the side surface of tip portion 411, and does not include a corner. That is, the entire tip surface of discharge electrode 41 is a curved surface (bent surface).

For example, radius of curvature r2 (see FIG. 4C) of the tip surface of discharge electrode 41 is preferably more than or equal to 0.2 mm. As described above, tip portion 411 of discharge electrode 41 has a rounded shape. Accordingly, the concentration of the electric field at tip portion 411 of discharge electrode 41 is reduced as compared with a case where tip portion 411 of discharge electrode 41 is sharp. Accordingly, partial breakdown discharge is easily caused.

Radius of curvature r1 (see FIG. 4B) of the tip surface of each of projecting portions 423 of counter electrode 42 herein is preferably more than or equal to ½ of radius of curvature r2 (see FIG. 4C) of the tip surface of discharge electrode 41. That is, it is preferable to satisfy a relational expression "$r1 \geq r2 \times ½$". The "radius of curvature" herein refers to a minimum value, that is, a radius of curvature of a portion where the curvature becomes maximum for both the tip surface of projecting portion 423 and the tip surface of discharge electrode 41. However, because FIG. 4B and FIG. 4C have different scales, "r1" in FIG. 4B and "r2" in FIG. 4C do not immediately represent a ratio of "r1" to "r2".

For example, in a case where radius of curvature r2 of the tip surface of discharge electrode 41 is 0.6 mm, the above relational expression is satisfied if radius of curvature r1 of the tip surface of projecting portion 423 is more than or equal to 0.3 mm. Further, it is more preferable that radius of curvature r1 of the tip surface of projecting portion 423 is larger than radius of curvature r2 of the tip surface of discharge electrode 41. As described above, partial breakdown discharge is easily caused in the state where radius of curvature r1 of the tip surface of projecting portion 423 is relatively larger than radius of curvature r2 of the tip surface of discharge electrode 41.

(2.4) Discharge Mode

Figure 5B:
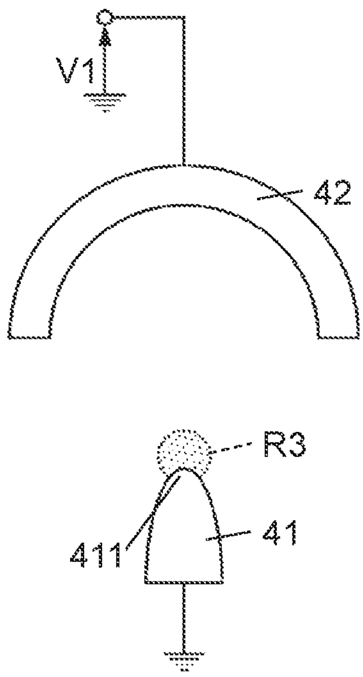
FIG. 5B is a schematic view showing a discharge mode of a corona discharge.
Figure 5C:
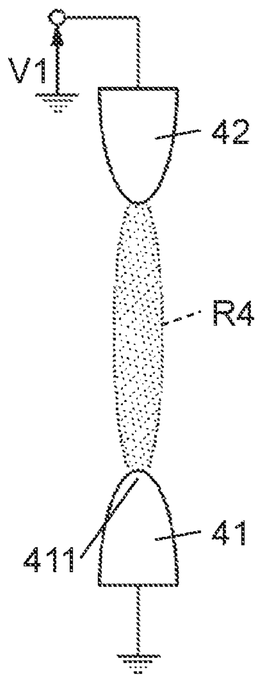
FIG. 5C is a schematic view showing a discharge mode of a leader discharge.

Details of a discharge mode generated when application voltage V1 is applied between discharge electrode 41 and counter electrode 42 will be hereinafter described with reference to FIGS. 5A to 5C. FIGS. 5A to 5C are conceptual views for explaining the discharge mode. FIGS. 5A to 5C each schematically show discharge electrode 41 and counter electrode 42. Moreover, in discharge device 10 according to the present exemplary embodiment, liquid 50 is actually held in discharge electrode 41, and a discharge is generated between liquid 50 and counter electrode 42. However, each of FIGS. 5A to 5C omits illustration of liquid 50. Furthermore, a case where liquid 50 is absent at tip portion 411 (see FIG. 4C) of discharge electrode 41 (see FIG. 4C) will be described. However, when liquid 50 is present, "tip portion 411 of discharge electrode 41" in the portion of discharge generation may be read as "liquid 50 held by discharge electrode 41".

Initially described with reference to FIG. 5A herein will be partial breakdown discharge adopted for voltage application device 1 and discharge device 10 according to the present exemplary embodiment.

Specifically, discharge device 10 initially generates a local corona discharge at tip portion 411 of discharge electrode 41. In the present exemplary embodiment, discharge electrode 41 is on the negative electrode (ground) side. Accordingly, the corona discharge generated at tip portion 411 of discharge electrode 41 is a negative electrode corona. Discharge device 10 further develops the corona discharge generated at tip portion 411 of discharge electrode 41 to a higher energy discharge. This high-energy discharge forms discharge path L1 partially dielectrically broken is formed between discharge electrode 41 and counter electrode 42.

In addition, while the partial breakdown discharge includes partial dielectric breakdown between the pair of electrodes (discharge electrode 41 and counter electrode 42), the partial breakdown discharge is such a discharge where dielectric breakdown is not continuously caused, but intermittently caused. Therefore, a discharge current generated between the pair of electrodes (discharge electrode 41 and counter electrode 42) is also intermittently generated. That is, in a case where a power supply (voltage application circuit 2) does not have a current capacity required to maintain discharge path L1, for example, a voltage applied between the pair of electrodes drops as soon as the corona discharge is developed into the partial breakdown discharge. In this case, discharge path L1 is interrupted, and the discharge stops. The "current capacity" herein is a capacity of a current releasable in a unit time. By repeating generation and stop of the discharge in this manner, the discharge current intermittently flows. As described above, partial breakdown discharge is different from a glow discharge and an arc discharge which continuously causes dielectric breakdown (that is, continuously generates a discharge current) in the point where a state of high discharge energy and a state of low discharge energy are repeated.

More specifically, voltage application device 1 applies application voltage V1 between discharge electrode 41 and counter electrode 42 disposed so as to face each other with a clearance left from each other to generate a discharge between discharge electrode 41 and counter electrode 42. Moreover, discharge path L1 partially dielectrically broken is formed between discharge electrode 41 and counter electrode 42 at the time of generation of a discharge. Discharge path L1 formed at this time includes first dielectric breakdown region R1 formed around discharge electrode 41, and second dielectric breakdown region R2 formed around counter electrode 42 as shown in FIG. 5A.

That is, discharge path L1 dielectrically broken is formed between discharge electrode 41 and counter electrode 42 not entirely but partially (locally). As described above, in the partial breakdown discharge, discharge path L1 formed between discharge electrode 41 and counter electrode 42 is a path not completely broken, but partially and dielectrically broken.

As explained in the column of "(2.3) Electrode shape", the shape of tip portion 411 (R shape) of discharge electrode 41 and projection amount D1 of projecting portion 423 are appropriately set so as to moderately reduce the concentration of the electric field. Accordingly, partial breakdown discharge is easily achievable. Specifically, the shape of tip portion 411 and projection amount D1 (see FIG. 4A) are appropriately set so as to reduce the concentration of the electric field together with other factors such as a length of discharge electrode 41 and application voltage V1. In this manner, the concentration of the electric field can be moderately reduced. As a result, when a voltage is applied between discharge electrode 41 and counter electrode 42, complete breakdown such as a complete breakdown discharge is not caused, but only partial dielectric breakdown is caused. As a result, partial breakdown discharge can be achieved.

Discharge path L1 herein includes first dielectric breakdown region R1 formed around discharge electrode 41, and second dielectric breakdown region R2 formed around counter electrode 42. That is, first dielectric breakdown region R1 is a region dielectrically broken around discharge electrode 41, while second dielectric breakdown region R2 is a region dielectrically broken around counter electrode 42. When application voltage V1 is applied between liquid 50 and counter electrode 42 in a state where liquid 50 is held by discharge electrode 41 herein, first dielectric breakdown region R1 is formed particularly around liquid 50 in an area around discharge electrode 41.

First dielectric breakdown region R1 and second dielectric breakdown region R2 are formed apart from each other so as not to come into contact with each other. In other words, discharge path L1 includes a region (insulation region) not dielectrically broken and formed at least between first dielectric breakdown region R1 and second dielectric breakdown region R2. Accordingly, in the partial breakdown discharge, complete breakdown is not caused in the space between discharge electrode 41 and counter electrode 42, and the discharge current flows through discharge path L1 in a partially dielectrically broken state. In short, even in the case of discharge path L1 partially and dielectrically broken, in other words, discharge path L1 including a part not dielectrically broken, the discharge current flows through discharge path L1 between discharge electrode 41 and counter electrode 42, and a discharge is generated.

Second dielectric breakdown region R2 herein is basically formed in counter electrode 42 around a portion where a distance (spatial distance) to discharge electrode 41 is the shortest. In the present exemplary embodiment, as shown in FIG. 4A, counter electrode 42 has shortest distance D2 to discharge electrode 41 in extension portion 424 having a tapered shape and formed at the tip portion of each of projecting portions 423. Accordingly, second dielectric breakdown region R2 is formed around extension portion 424. That is, counter electrode 42 shown in FIG. 5A actually corresponds to extension portion 424 of projecting portion 423 shown in FIG. 4A.

Moreover, in the present exemplary embodiment, counter electrode 42 has a plurality of (four in this example) projecting portions 423 as described above, and distances D2 from the plurality of projecting portions 423 to discharge electrode 41 (see FIG. 4A) are equalized. Therefore, second dielectric breakdown region R2 is formed around extension portion 424 of any one of the plurality of projecting portions 423. Projecting portion 423 for which second dielectric breakdown region R2 is formed herein is not limited to specific projecting portion 423, but is randomly determined from the plurality of projecting portions 423.

Meanwhile, in the partial breakdown discharge, as shown in FIG. 5A, first dielectric breakdown region R1 around discharge electrode 41 extends from discharge electrode 41 toward counterpart counter electrode 42. Second dielectric breakdown region R2 around counter electrode 42 extends from counter electrode 42 toward counterpart discharge electrode 41. In other words, first dielectric breakdown region R1 and second dielectric breakdown region R2 extend in a direction for attracting each other from discharge electrode 41 and counter electrode 42, respectively. Therefore, each of first dielectric breakdown region R1 and second dielectric breakdown region R2 has a length along discharge path L1. As described above, in the partial breakdown discharge, partially dielectrically broken region (each of first dielectric breakdown region R1 and second dielectric breakdown region R2) has a shape elongated long in a specific direction.

Next, a corona discharge will be described with reference to FIG. 5B.

Generally, when energy is applied between a pair of electrodes to generate a discharge, a discharge mode develops from a corona discharge to a glow discharge or an arc discharge in accordance with an amount of input energy.

Each of the glow discharge and the arc discharge is a discharge causing dielectric breakdown between a pair of electrodes. In the glow discharge and the arc discharge, a discharge path formed by dielectric breakdown is maintained while energy is input between the pair of electrodes. In this case, a discharge current is continuously generated between the pair of electrodes. On the other hand, as shown in FIG. 5B, the corona discharge is a discharge locally generated at one electrode (discharge electrode 41), and not dielectrically broken between the pair of electrodes (discharge electrode 41 and counter electrode 42). In short, a local corona discharge is generated at tip portion 411 of discharge electrode 41 when application voltage V1 is applied between discharge electrode 4 and counter electrode 42. Discharge electrode 41 herein is on the negative electrode (ground) side. Accordingly, the corona discharge generated at tip portion 411 of discharge electrode 41 is a negative polarity corona. At this time, region R3 locally and dielectrically broken may be formed around tip portion 411 of discharge electrode 41. Region R3 thus formed does not have a shape elongated long in a specific direction as in each of first dielectric breakdown region R1 and second dielectric breakdown region R2 in a partial breakdown discharge, but has a point shape (or spherical shape).

When the current capacity dischargeable from the power supply (voltage application circuit 2) between the pair of electrodes per unit time is sufficiently large herein, a discharge path once formed is maintained without interruption, and a corona discharge develops to a glow discharge or an arc discharge as described above.

Next, a complete breakdown discharge will be described with reference to FIG. 5C.

As shown in FIG. 5C, the complete breakdown discharge is a discharge mode which intermittently repeats a phenomenon where a corona discharge develops into complete breakdown between the pair of electrodes (discharge electrode 41 and counter electrode 42). That is, in the complete breakdown discharge, a discharge path entirely and dielectrically broken is formed between discharge electrode 41 and counter electrode 42 in the space between discharge electrode 41 and counter electrode 42. At this time, region R4 entirely and dielectrically broken may be formed between tip portion 411 of discharge electrode 41 and counter electrode 42 (extension portion 424 of any of projecting portions 423 shown in FIG. 4A). Region R4 described above is not partially formed as in each of first dielectric breakdown region R1 and second dielectric breakdown region R2 in a partial breakdown discharge, but is formed so as to connect tip portion 411 of discharge electrode 41 and counter electrode 42.

In addition, while the complete breakdown discharge includes dielectric breakdown (complete breakdown) between the pair of electrodes (discharge electrode 41 and counter electrode 42), the complete breakdown discharge is such a discharge where dielectric breakdown is not continuously caused, but intermittently caused. Therefore, a discharge current generated between the pair of electrodes (discharge electrode 41 and counter electrode 42) is also intermittently generated. That is, as described above, in a case where a power supply (voltage application circuit 2) does not have a current capacity required to maintain the discharge path, for example, a voltage applied between the pair of electrodes drops as soon as the corona discharge is developed into the complete breakdown discharge. In this case, the discharge path is interrupted, and the discharge stops. By repeating generation and stop of the discharge in this manner, the discharge current intermittently flows. As described above, a complete breakdown discharge is different from a glow discharge and an arc discharge which continuously causes dielectric breakdown (that is, continuously generates a discharge current) in the point where a state of high discharge energy and a state of low discharge energy are repeated.

Moreover, in the partial breakdown discharge (see FIG. 5A), radicals are generated with higher energy in comparison with a corona discharge (see FIG. 5B), and a large amount of radicals about 2 to 10 times as large as the amount of the corona discharge are generated. The radicals generated in this manner constitute a basis for exerting useful effects including not only sterilization, deodorization, moisturization, freshness, and virus inactivation, but also useful effects in various situations. Note herein that ozone is also generated when radicals are generated by a partial breakdown discharge. However, while the partial breakdown discharge generates approximately 2 to 10 times as many as radicals of the corona discharge, an amount of generated ozone is suppressed to a level similar to an amount of ozone in the corona discharge.

Moreover, in the partial breakdown discharge shown in FIG. 5A, disappearance of radicals resulting from excessive energy can be suppressed as compared with the complete breakdown discharge shown in FIG. 5C, and radical generation efficiency improves as compared with the complete breakdown discharge. Specifically, in the complete breakdown discharge, the energy associated with the discharge is excessively high. Accordingly, a part of the generated radicals disappear. In this case, generation efficiency of active components may lower. On the other hand, in the partial breakdown discharge, energy associated with the discharge is suppressed to be small as compared with the complete breakdown discharge. Accordingly, a disappearance amount of radicals as a result of exposure to excessive energy is reduced, and radical generation efficiency improves.

Consequently, voltage application device 1 and discharge device 10 each adopting a partial breakdown discharge according to the present exemplary embodiment offer an advantage of improving generation efficiency of active components (e.g., air ions, radicals, and charged fine particle liquid containing these) as compared with a corona discharge and a complete breakdown discharge.

Furthermore, in the partial breakdown discharge, concentration of an electric field is reduced as compared with the complete breakdown discharge. Therefore, in the complete breakdown discharge, a large discharge current momentarily flows between discharge electrode 41 and counter electrode 42 through a discharge path completely broken, and electric resistance at that time is considerably low. On the other hand, in the partial breakdown discharge, concentration of the electric field is reduced. Accordingly, a maximum current that instantaneously flows between discharge electrode 41 and counter electrode 42 during formation of discharge path L1 partially and dielectrically broken is suppressed to be small as compared with the complete breakdown discharge. As a result, in the partial breakdown discharge, generation of nitride oxides (NOx) is suppressed as compared with the complete breakdown discharge, and electrical noise is suppressed to small noise.

(2.5) Measures Against Sound

Figure 6:
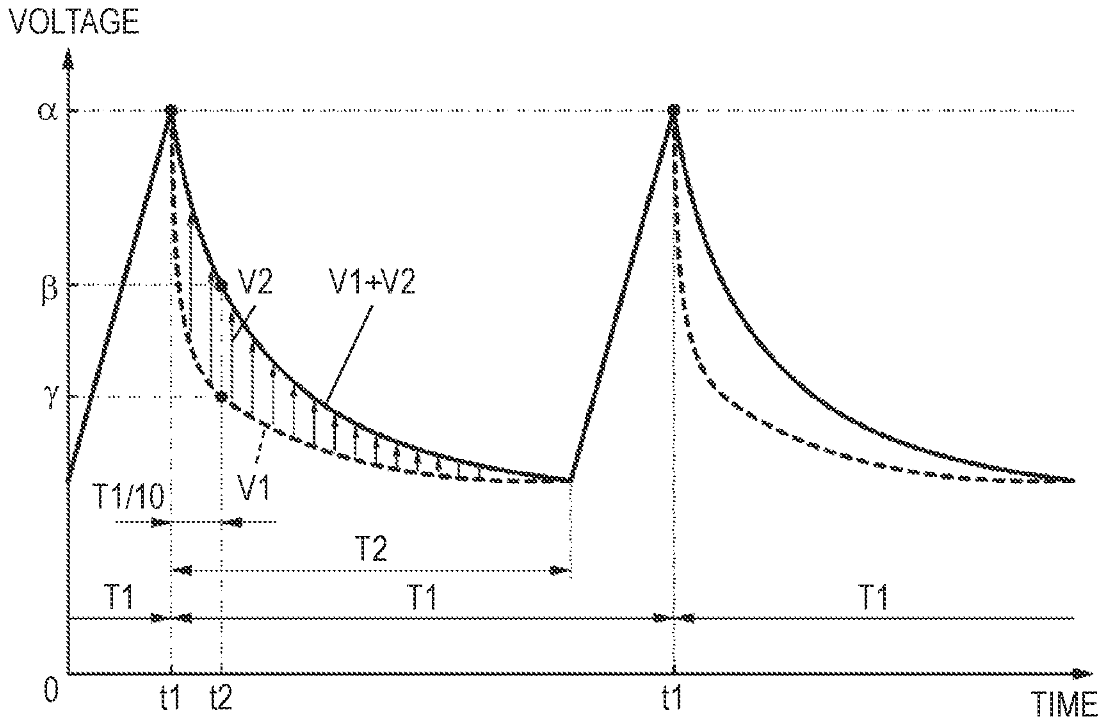
FIG. 6 is a waveform diagram schematically showing an output voltage of a voltage application device included in the discharge device according to the first exemplary embodiment.
Figure 7:
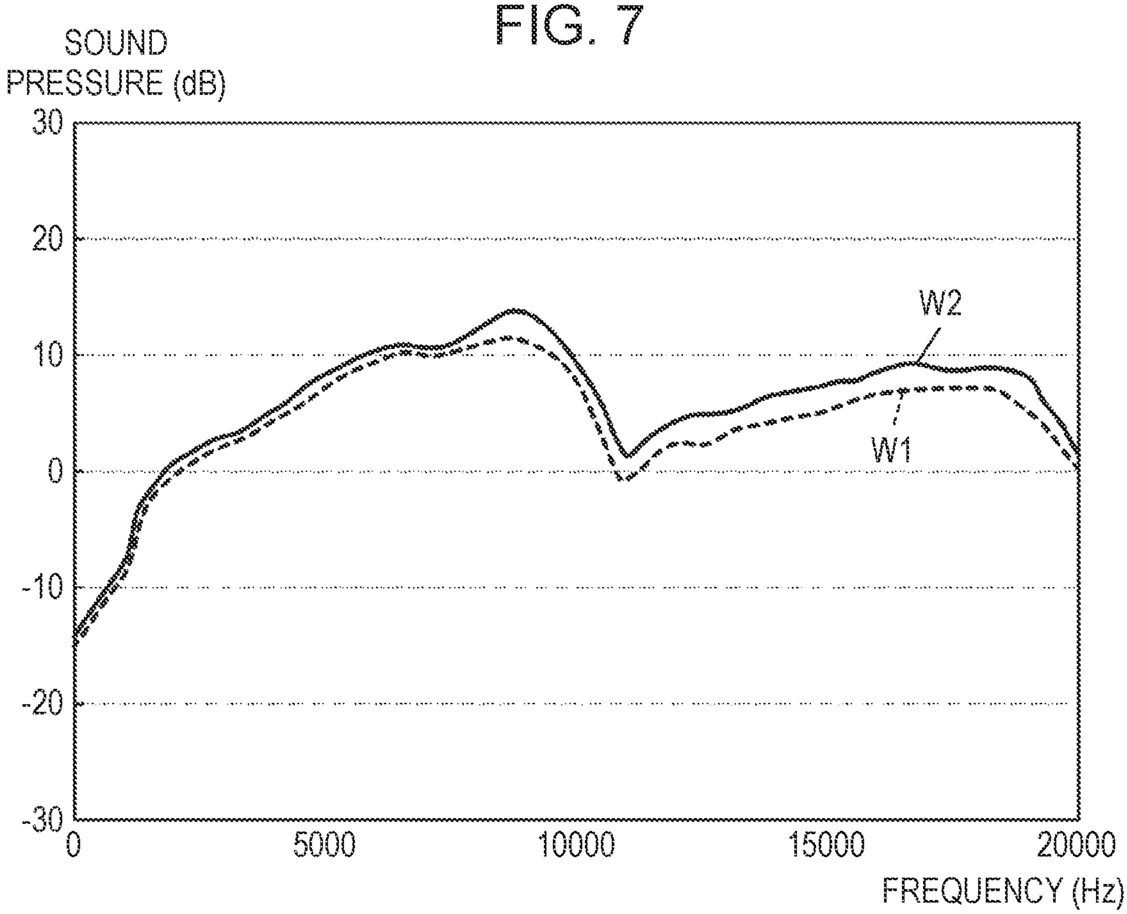
FIG. 7 is a graph schematically showing frequency characteristics of sound generated from the discharge device according to the first exemplary embodiment.

Next, details of measures against sound using maintaining voltage V2 will be described with reference to FIGS. 6 and 7. FIG. 6 is a graph which has a horizontal axis representing a time axis, and a vertical axis representing an output voltage (voltage applied to load 4) of voltage application circuit 2. FIG. 7 is a graph which has a horizontal axis representing a frequency axis, and a vertical axis representing a magnitude of sound (sound pressure) emitted from discharge device 10.

As described above, in the present exemplary embodiment, voltage application circuit 2 intermittently generates a discharge by periodically changing the magnitude of application voltage V1 as shown in FIG. 6. That is, assuming that a cycle of changes of application voltage V1 is discharge cycle T1, a discharge (partially partial breakdown discharge) is generated in discharge cycle T1. It is defined herein that a time point where a discharge is generated is defined as first time point t1.

In addition, as shown in FIG. 6, voltage application circuit 2 applies maintaining voltage V2 for suppressing contraction of liquid 50 to load 4 during intermittent period T2 from generation of a discharge to a next discharge in addition to application voltage V1. It is assumed in the present exemplary embodiment presented by way of example that a period in which voltage application circuit 2 operates in the second mode in discharge cycle T1 is defined as intermittent period T2.

Specifically, in intermittent period T2, maintaining voltage V2 is applied to load 4 in addition to application voltage V1 applied to load 4 by voltage application circuit 2 to generate a discharge. Accordingly, the voltage applied to load 4 is raised by the amount of maintaining voltage V2. In other words, a sum of voltages (V1+V2) of application voltage V1 and maintaining voltage V2 is applied to load 4. Therefore, as indicated by a broken line in FIG. 6, a drop degree of a voltage applied to load 4 after first time point t1 at which a discharge is generated is reduced as compared with a case where maintaining voltage V2 is not applied (that is, when only application voltage V1 is applied). In this case, in intermittent period T2, the voltage applied to load 4 gradually decreases with an elapse of time, but an amount of decrease is reduced by the amount of maintaining voltage V2.

As described above, a voltage is applied herein between discharge electrode 41 and counter electrode 42. Accordingly, force generated by an electric field and pulling liquid 50 toward counter electrode 42 acts on liquid 50 held in discharge electrode 41. At this time, liquid 50 held at discharge electrode 41 receives force generated by the electric field, and expands toward counter electrode 42 in a direction where discharge electrode 41 and counter electrode 42 faces each other to form a conical shape called a Taylor cone. Then, in a state where liquid 50 expands with a sharp tip portion of the Taylor cone, an electric field is concentrated on the tip portion (apex portion) of the Taylor cone. As a result, a discharge is generated. When the discharge starts at first time point t1, an influence of the electric field decreases. Accordingly, force in a direction of expanding the Taylor cone (liquid 50) decreases, and the Taylor cone (liquid 50) contracts. When the electric field becomes more intense after an elapse of a certain time from first time point t1, the Taylor cone (liquid 50) again expands. In this manner, the magnitude of the voltage applied to load 4 periodically changes at the drive frequency. Accordingly, liquid 50 held in discharge electrode 41 expands and contracts periodically (see FIGS. 2A and 2B), and mechanical vibration is produced in liquid 50.

Meanwhile, when liquid 50 excessively contracts after generation of the discharge in accordance with this mechanical vibration of liquid 50, amplitude of the mechanical vibration of liquid 50 excessively increases. In this case, sound produced by the vibration of liquid 50 may increase. For example, in a case where maintaining voltage V2 is not applied as indicated by a broken line in FIG. 6, an influence of an electric field becomes excessively small after the elapse of first time point t1 at which a discharge is generated. Accordingly, the Taylor cone (liquid 50) may rapidly contract due to surface tension or the like of liquid 50. In this case, the amplitude of the mechanical vibration of liquid 50 excessively increases. In this case, sound produced by the vibration of liquid 50 may increase.

Each of voltage application device 1 and discharge device 10 according to the present exemplary embodiment uses maintaining voltage V2 to suppress this excessive contraction of liquid 50 described above after generation of the discharge, and thus lower the possibility of sound produced by vibration of liquid 50. Specifically, according to voltage application device 1 and discharge device 10, maintaining voltage V2 is applied to load 4 in addition to application voltage V1 during intermittent period T2 from generation of a discharge to next generation of a discharge. By addition of maintaining voltage V2, voltage application device 1 and discharge device 10 each maintain such a level of the electric field which delays contraction of the Taylor cone (liquid 50) by surface tension of liquid 50 or the like even after the time of generation of the discharge (first time point t1). As a result, an excessive increase in the amplitude of the mechanical vibration of liquid 50 can be suppressed. As a result, sound produced by vibration of liquid 50 can be reduced.

More specifically, liquid 50 mechanically vibrates, that is, repeatedly expands and contracts in accordance with the cycle of the discharge (discharge cycle T1). It is preferable herein that magnitude β of the voltage applied to load 4 at second time point t2 (see FIG. 6) immediately after liquid 50 is fully expanded is more than or equal to ⅔ of the magnitude (maximum value α) of the voltage applied to load 4 at first time point t1 at which the discharge is generated. In addition, magnitude β of the voltage applied to load 4 at second time point t2 is equal to or less than magnitude α of the voltage applied to load 4 at first time point t1. That is, it is preferable to satisfy a relational expression "$\alpha \geq \beta \geq \alpha \times ⅔$". The term "immediately after" herein includes a period after a time of full expansion of liquid 50, and after a certain time from a start of contraction of liquid 50 fully expanded. It is more preferable, however, that the term "immediately after" is a period after the time of full expansion of liquid 50, and a period in which fully expanded liquid 50 is accelerating in a contraction direction. In addition, it is more preferable that the term "immediately after" is a period after the time of full expansion of liquid 50, and a period until fully expanded liquid 50 starts contraction.

Specifically, inertial force also acts on liquid 50 while liquid 50 is mechanically vibrating. Accordingly, even if the influence of the electric field on liquid 50 decreases at first time point t1 at which the discharge is generated, liquid 50 continues deformation in the expansion direction for a while after first time point t1. Thereafter, when the inertial force in the expansion direction of liquid 50 and the surface tension in the direction of contraction of liquid 50 and the like are balanced, liquid 50 comes to full expansion, and then contracts by the surface tension or the like. Magnitude β of the voltage at second time point t2 immediately after the full expansion of liquid 50 as described above has certain relative magnitude with respect to magnitude α of the voltage at first time point t1. In this case, contraction of the Taylor cone (liquid 50) produced by surface tension or the like can be delayed.

For example, in a case where magnitude α of the voltage applied to load 4 at first time point t1 is 6.0 kV, the above relational expression, that is, "$\alpha \geq \beta \geq \alpha \times ⅔$" is satisfied when magnitude β of the voltage applied to load 4 at second time point t2 is more than or equal to 4.0 kV. In a case where maintaining voltage V2 is not applied (i.e., in a case where only application voltage V1 is applied) in the example of FIG. 6, magnitude γ of the voltage applied to load 4 at second time point t2 is less than ⅔ of magnitude α of the voltage applied to load 4 at first time point t1. In other words, by applying maintaining voltage V2, the magnitude of the voltage applied to load 4 at least at second time point t2 is raised by the amount of "β−γ". Accordingly, contraction of the Taylor cone (liquid 50) produced by surface tension or the like can be delayed.

Moreover, the discharge frequency of discharge electrode 41 is preferably 600 Hz or more and 5000 Hz or less. In this case, the frequency (drive frequency) of changes of application voltage V1 is also 600 Hz or more and 5000 Hz or less. If the discharge frequency is 500 Hz, discharge cycle T1 is 0.002 seconds. If the discharge frequency is 5000 Hz, discharge cycle T1 is 0.0002 seconds.

Further, second time point t2 is preferably a time point when a time of 1/10 of the discharge cycle has elapsed from first time point t1. That is, it is preferable that the time from first time point t1 to second time point t2 is set to the time of 1/10 of discharge cycle T1. Particularly in the case where the discharge frequency (drive frequency) is in the range of 600 Hz or more and 5000 Hz or less as described above, liquid 50 often fully expands after an elapse of a time of about 1/10 of discharge cycle T1 from first time point t1. Accordingly, it is more preferable that second time point t2 is a time point when the time of 1/10 of the discharge cycle has elapsed from first time point t1.

As described above, voltage application device 1 and discharge device 10 according to the present exemplary embodiment are each capable of reducing the level of sound (sound pressure) emitted from discharge device 10 as shown in FIG. 7 by applying maintaining voltage V2 for suppressing contraction of liquid 50 to load 4 in addition to application voltage V1. In FIG. 7, curve W1 is a graph when maintaining voltage V2 is applied to load 4 in addition to application voltage V1, and curve W2 is a graph when maintaining voltage V2 is not applied (i.e., when only application voltage V1 is applied).

As apparent from FIG. 7, voltage application device 1 and discharge device 10 are each capable of reducing the level of sound (sound pressure) emitted from discharge device 10 in a substantially entire audible range (20 Hz to 20000 Hz) by applying maintaining voltage V2 to load 4 in addition to application voltage V1. In the example of FIG. 7, the sound pressure is also reduced in a frequency band of 1000 Hz to 2000 Hz, where sound is relatively easy to hear. It is preferable herein that voltage application device 1 reduces sound pressure produced by mechanical vibration of liquid 50 by 1 dB or more by applying maintaining voltage V2 to load 4. Specifically, it is preferable that sound emitted from discharge device 10 decreases by more than or equal to 1 dB in a case where maintaining voltage V2 is applied to load 4 in addition to application voltage V1, in comparison with a case where maintaining voltage V2 is not applied (i.e., in a case where only application voltage V1 is applied). It is sufficient if a decrease in sound pressure of more than or equal to 1 dB is achieved in at least a part of the audible range (20 Hz to 20000 Hz).

Further, examples of expected effects produced by applying maintaining voltage V2 for suppressing contraction of liquid 50 to load 4 in addition to application voltage V1 include improvement in energy utilization efficiency as well as reduction of sound. Specifically, when maintaining voltage V2 is applied, a drop degree of a voltage applied to load 4 after first time point t1 at which a discharge is generated is reduced as compared with a case where maintaining voltage V2 is not applied (that is, in a case where only application voltage V1 is applied). As a result, disappearance of electric charges accumulated in the expanded Taylor cone (liquid 50) is suppressed. The energy given to load 4 can be effectively utilized for a discharge by effectively using these electric charges for a next discharge.

(3) Modifications

The first exemplary embodiment is only one of various exemplary embodiments of the present disclosure. The first exemplary embodiment can be modified in various ways in accordance with design or the like as long as the object of the present disclosure can be achieved. In addition, the drawings referred to in the present disclosure are all schematic drawings, and ratios of sizes and thicknesses of respective components in the figures do not necessarily reflect actual dimensional ratios. Modifications of the first exemplary embodiment will be hereinafter listed. The modifications described below may be combined and applied as appropriate.

(3.1) First Modification

The shape of counter electrode 42 in a first modification is different from the corresponding shape of the first exemplary embodiment as shown in FIGS. 8A to 8D. FIGS. 8A to 8D are each plan views of a main part including the counter electrode of discharge device 10.

Figure 8A:
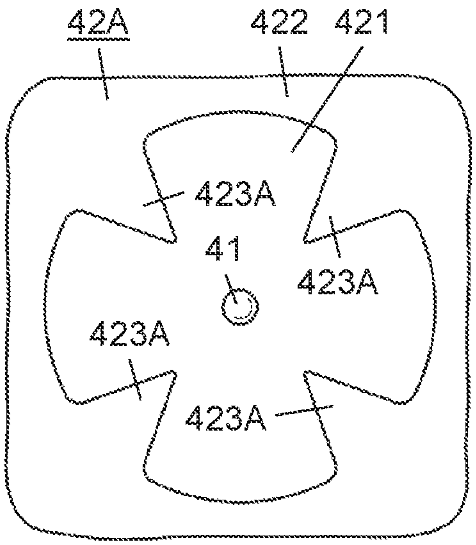
FIG. 8A is a plan view of a discharge electrode and a counter electrode in a discharge device according to a first modification of the first exemplary embodiment.
Figure 8B:
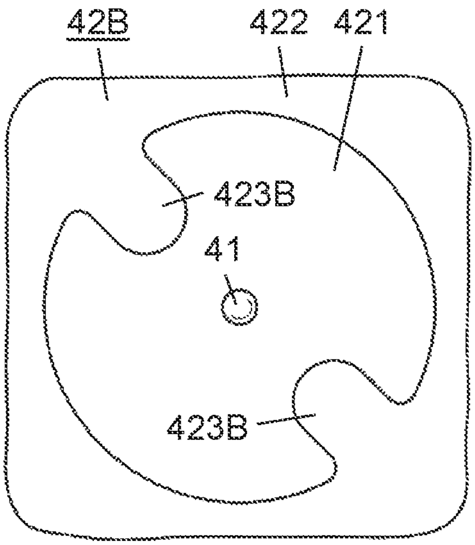
FIG. 8B is a plan view of the discharge electrode and the counter electrode in the discharge device according to the first modification of the first exemplary embodiment.

In the example of FIG. 8A, counter electrode 42A includes projecting portions 423A each of which has a substantially triangular shape. In each of projecting portions 423A thus shaped, the apex of the triangle is directed to the center of opening 421. Accordingly, a tip portion of projecting portion 423A has a sharp (acute) shape. In the example of FIG. 8B, counter electrode 42B includes two projecting portions 423B projecting from support portion 422. Each of two projecting portions 423B projects toward the center of opening 421. Moreover, two projecting portions 423B are disposed in opening 421 at equal intervals.

Figure 8C:
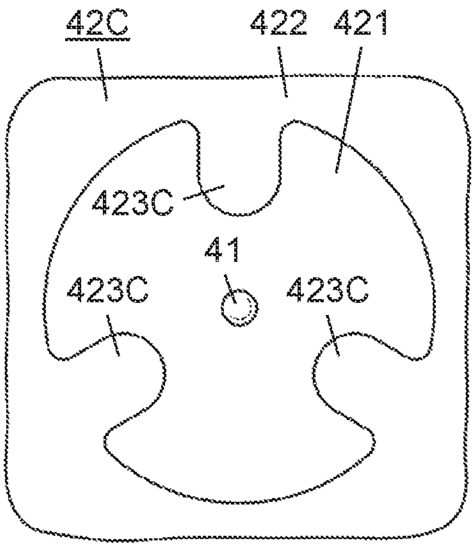
FIG. 8C is a plan view of the discharge electrode and the counter electrode in the discharge device according to the first modification of the first exemplary embodiment.
Figure 8D:
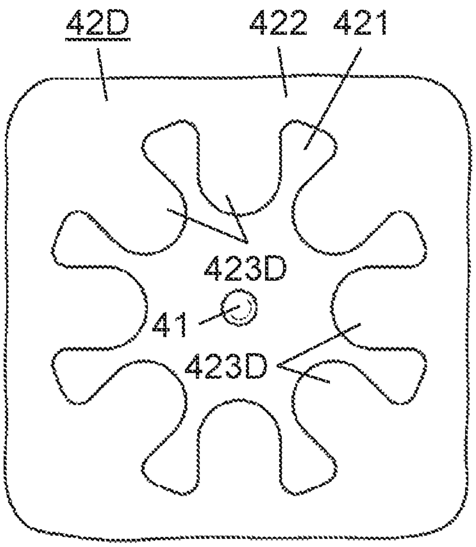
FIG. 8D is a plan view of the discharge electrode and the counter electrode in the discharge device according to the first modification of the first exemplary embodiment.

In the example of FIG. 8C, counter electrode 42C includes three projecting portions 423C projecting from support portion 422. Each of three projecting portions 423C projects toward the center of opening 421. In addition, three projecting portions 423C are disposed in opening 421 at equal intervals. As described above, an odd number of projecting portions 423C may be provided. In the example of FIG. 8D, counter electrode 42D includes eight projecting portions 423D projecting from support portion 422. Each of eight projecting portions 423D projects toward the center of opening 421. In addition, eight projecting portions 423D are disposed in opening 421 at equal intervals.

Moreover, the shapes of counter electrode 42 and discharge electrode 41 are not limited to the examples of FIGS. 8A to 8D, but may be modified as appropriate. For example, a number of projecting portions 423 of counter electrode 42 is not limited to 2 to 4 or 8, but may be 1, or 5 or more, for example. Further, it is not required to dispose the plurality of projecting portions 423 at equal intervals in a circumferential direction of opening 421. The plurality of protrusions 423 may be disposed at appropriate intervals in the circumferential direction of opening 421.

In addition, the shape of support portion 422 of counter electrode 42 is also not limited to a flat plate shape. For example, at least a part of a surface included in counter electrode 42 and facing discharge electrode 41 may include a concave curved surface or a convex curved surface. When the shape of the surface included in the counter electrode 42 and facing the discharge electrode 41 can uniformly increase the electric field at tip portion 411 of discharge electrode 41. Furthermore, support portion 422 may have a dome shape which covers discharge electrode 41.

(3.2) Other Modifications

Liquid supply unit 5 for generating charged fine particle liquid may be eliminated from discharge device 10. In this case, discharge device 10 generates air ions by a partial breakdown discharge generated between discharge electrode 41 and counter electrode 42.

In addition, liquid supply unit 5 is not required to have the configuration which cools discharge electrode 41 to generate dew condensation water on discharge electrode 41 as in the first exemplary embodiment. Liquid supply unit 5 may be configured to supply liquid 50 from a tank to discharge electrode 41 by using a capillary phenomenon or a supply mechanism such as a pump, for example. Moreover, liquid 50 is not limited to water (including condensation water), but may be a liquid other than water.

Furthermore, voltage application circuit 2 may be configured to apply a high voltage between discharge electrode 41 and counter electrode 42 while designating discharge electrode 41 as a positive electrode (plus) and counter electrode 42 as a negative electrode (ground). In addition, only a potential difference (voltage) is required to be generated between discharge electrode 41 and counter electrode 42. Accordingly, voltage application circuit 2 may designate a high potential side electrode (positive electrode) as the ground, and a low potential side electrode (negative electrode) as negative potential to apply a negative voltage to load 4. That is, voltage application circuit 2 may designate discharge electrode 41 as the ground, and counter electrode 42 as negative potential, or may designate discharge electrode 41 as negative potential and counter electrode 42 as the ground.

Moreover, voltage application device 1 may include a limiting resistor between voltage application circuit 2 and discharge electrode 41 or counter electrode 42 in load 4. The limiting resistor is a resistor for limiting a peak value of a discharge current flowing after dielectric breakdown in a partial breakdown discharge. For example, the limiting resistor is electrically connected between voltage application circuit 2 and discharge electrode 41, or between voltage application circuit 2 and counter electrode 42.

Furthermore, a specific circuit configuration of voltage application device 1 may be modified as appropriate. For example, voltage application circuit 2 is not limited to a self-excited converter, but may be a separately excited converter. In addition, voltage generation circuit 22 may be implemented with a transformer (piezoelectric transformer) having a piezoelectric element.

Moreover, the discharge mode adopted by voltage application device 1 and discharge device 10 is not limited to the mode described in the first exemplary embodiment. For example, each of voltage application device 1 and discharge device 10 may adopt a discharge in a mode which intermittently repeats a phenomenon where a corona discharge develops into dielectric breakdown, that is, a "complete breakdown discharge". In this case, discharge device 10 repeats the following phenomena. A relatively large discharge current flows momentarily at the time of development from a corona discharge to dielectric breakdown. Immediately after this phenomenon, an application voltage drops, and a discharge current is cut off. The application voltage again increases, and dielectric breakdown is caused.

Moreover, it is not required to have support portion 422 and the plurality of projecting portions 423 of counter electrode 42 each having a flat plate shape as a whole. For example, support portion 422 may have a three-dimensional shape such as a shape having a protrusion protruding in a thickness direction of support portion 422. Furthermore, for example, each of projecting portions 423 may project diagonally from an inner peripheral edge of opening 421 such that a distance to discharge electrode 41 in the longitudinal direction of discharge electrode 41 decreases toward the tip portion (extension portion 424).

Figure 9A:
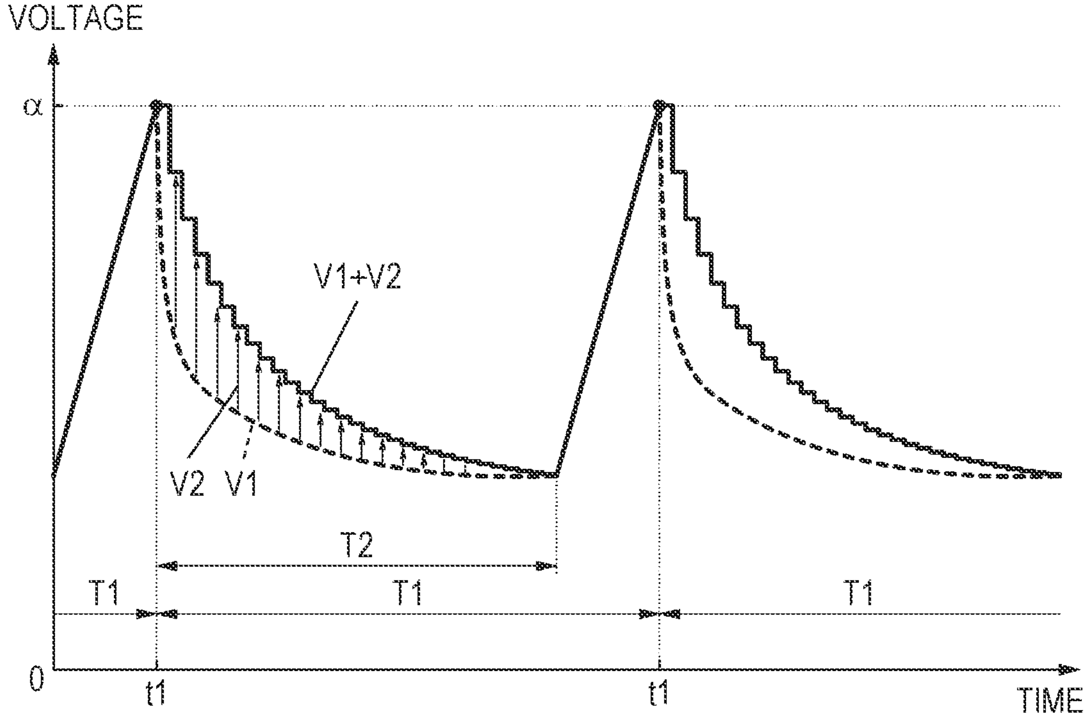
FIG. 9A is a waveform diagram schematically showing an output voltage of a voltage application device included in a discharge device according to a modification of the first exemplary embodiment.
Figure 9B:
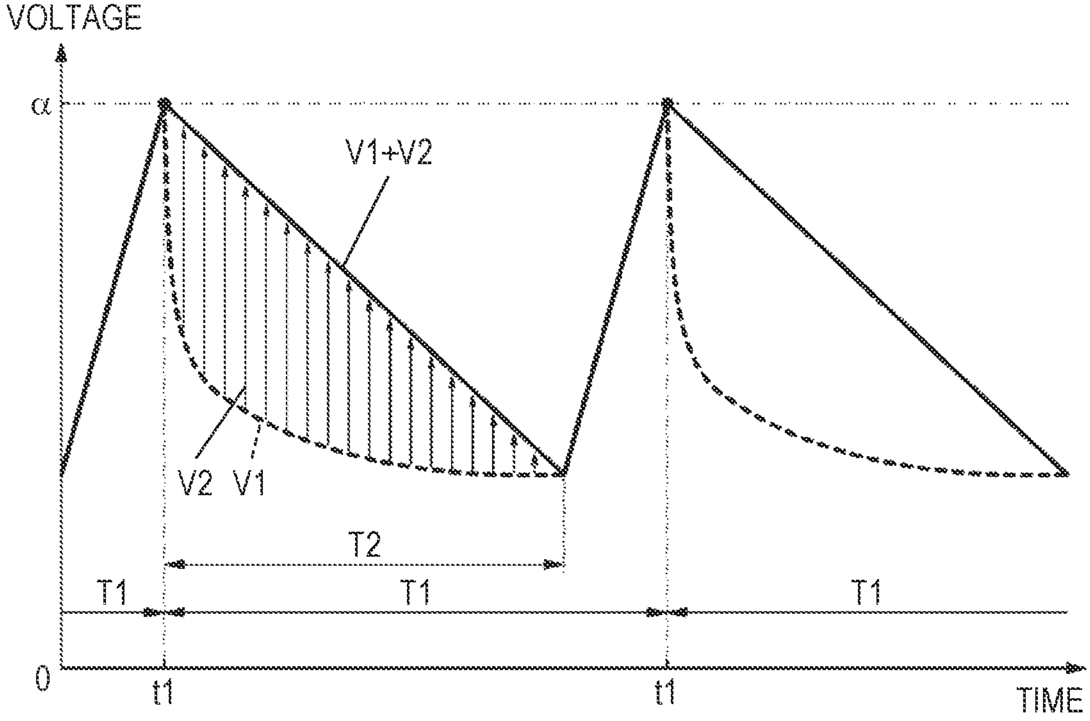
FIG. 9B is a waveform diagram schematically showing an output voltage of a voltage application device included in a discharge device according to a modification of the first exemplary embodiment.

In addition, voltage application circuit 2 is only required to apply maintaining voltage V2 for suppressing contraction of liquid 50 to load 4 in addition to application voltage V1 during a period from a discharge to a next discharge. A voltage waveform applied to load 4 is not limited to the example shown in FIG. 6. For example, as shown in FIG. 9A, the voltage applied to load 4 may be raised by maintaining voltage V2 in such a manner as to steppedly decrease with the elapse of time. In this case, the voltage waveform applied to load 4 becomes a stepped waveform as shown in FIG. 9A. Moreover, in another example, the voltage applied to load 4 may be raised by maintaining voltage V2 so as to linearly decrease with an elapse of time, i.e., change substantially linearly as shown in FIG. 9B. In this case, the voltage waveform applied to load 4 becomes a triangular waveform as shown in FIG. 9B.

In addition, counter electrode 42 may be eliminated from discharge device 10. In this case, a complete breakdown discharge is generated between discharge electrode 41 and a member present around discharge electrode 41, such as a housing. Furthermore, both liquid supply unit 5 and counter electrode 42 may be eliminated from discharge device 10.

In addition, functions similar to voltage application device 1 according to the first exemplary embodiment may be embodied as a control method of voltage application circuit 2, a computer program, a recording medium in which the computer program is recorded, or the like. Specifically, functions corresponding to control circuit 3 may be embodied as a control method of voltage application circuit 2, a computer program, a recording medium in which the computer program is recorded, or the like.

Moreover, in a comparison between two values, "more than or equal to" includes both a case where the two values are equal and a case where one of the two values exceeds the other. However, the present invention is not limited to this definition, and "more than or equal to" herein may be synonymous with "more than" including only a case where one of the two values exceeds the other. That is, whether or not the case of two values equal to each other is included may be changed in any manner depending on settings of threshold values and the like. Accordingly, which of "more than or equal to" and "more than" is used does not produce a technical difference. Similarly, "less than" may be synonymous with "less than or equal to".

Second Exemplary Embodiment

Figure 10:
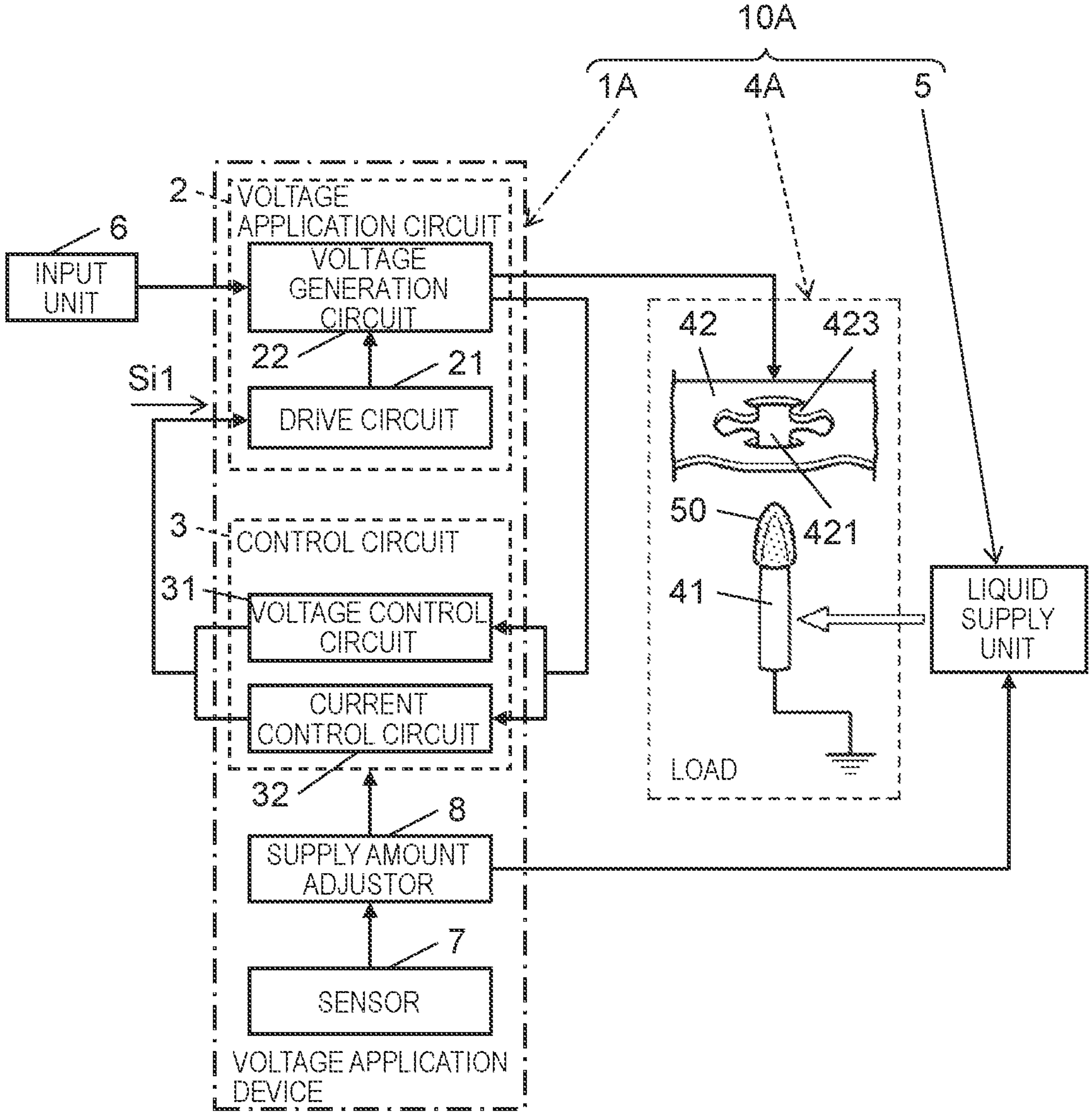
FIG. 10 is a block diagram of a discharge device according to a second exemplary embodiment.

As shown in FIG. 10, discharge device 10A according to the present exemplary embodiment is different from discharge device 10 according to the first exemplary embodiment in that sensor 7 for measuring at least either temperature or humidity is further provided. Hereinafter, configurations similar to the configurations in the first exemplary embodiment will be given common reference numerals, and description of these configurations will be omitted as appropriate.

Sensor 7 is a sensor that detects a state around discharge electrode 41. Sensor 7 detects information related to an environment (state) around discharge electrode 41, including at least either temperature or humidity (relative humidity). The environment (state) around discharge electrode 41 to be detected by sensor 7 includes an odor index, illuminance, and presence/absence of a person, in addition to temperature and humidity, for example. In the description of the present exemplary embodiment, it is assumed that voltage application device 1A includes sensor 7 as a component. However, sensor 7 is not required to be included in the components of voltage application device 1A.

Discharge device 10A according to the present exemplary embodiment further includes supply amount adjustor 8. Supply amount adjustor 8 adjusts a supply amount of liquid 50 (condensation water) in liquid supply unit 5 based on an output of sensor 7. In the description of the present exemplary embodiment, it is assumed that voltage application device 1A includes supply amount adjustor 8 as a component. However, supply amount adjustor 8 is not required to be included in the components of voltage application device 1A.

As described in the first exemplary embodiment, liquid supply unit 5 cools discharge electrode 41 using cooling device 51 (see FIG. 3B) to generate liquid 50 (condensation water) using discharge electrode 41. Accordingly, if the temperature or humidity around discharge electrode 41 changes, the amount of produced liquid 50 changes. Therefore, the amount of produced liquid 50 can be easily kept constant regardless of temperature and humidity by adjusting at least either one of the amounts of produced liquid 50 using liquid supply unit 5 based on at least either temperature or humidity.

Specifically, voltage application device 1A includes a microcomputer, and supply amount adjustor 8 is implemented by this microcomputer. Specifically, the microcomputer as supply amount adjustor 8 acquires an output of sensor 7 (hereinafter also referred to as "sensor output"), and adjusts the amount of liquid 50 produced by liquid supply unit 5 according to the sensor output.

Supply amount adjustor 8 described above adjusts the amount of liquid 50 (condensation water) produced by liquid supply unit 5 based on the output of sensor 7. For example, supply amount adjustor 8 reduces the amount of liquid 50 (condensation water) produced by liquid supply unit 5 as the temperature around discharge electrode 41 increases or the humidity increases. In this manner, the amount of liquid 50 (condensation water) produced by liquid supply unit 5 can be easily kept constant by reducing the amount of produced liquid 50 produced in a situation where the amount of produced liquid 50 (condensation water) generated increases at high humidity, for example. Adjustment of the amount of liquid 50 (condensation water) produced by liquid supply unit 5 is achieved by changing a set temperature of cooling device 51 through adjustment of an energization amount (current value) applied to a pair of Peltier elements 511, for example.

Moreover, as in the second exemplary embodiment, it is not required that supply amount adjustor 8 of discharge device 10A adjusts the supply amount of liquid 50 from liquid supply unit 5 based on an output of sensor 7. That is, supply amount adjustor 8 is only required to have a function of adjusting the supply amount of liquid 50 from liquid supply unit 5.

The configurations (including modifications) described in the second exemplary embodiment can be applied in combination with the configurations (including modifications) described in the first exemplary embodiment as appropriate.

SUMMARY

As described above, voltage application device (1, 1A) according to a first aspect includes voltage application circuit (2). Voltage application circuit (2) causes discharge electrode (41) to generate a discharge by applying application voltage (V1) to load (4) that includes discharge electrode (41) holding liquid (50). Voltage application circuit (2) periodically changes a magnitude of application voltage (V1) to generate a discharge intermittently. Voltage application circuit (2) applies maintaining voltage (V2) to load (4) for suppressing contraction of liquid (50) in addition to application voltage (V1) during intermittent period (T2) from a discharge to a next discharge.

According to this aspect, maintaining voltage (V2) is applied to load (4) in addition to application voltage (V1) in intermittent period (T2). Accordingly, the voltage applied to load (4) is raised by the amount of maintaining voltage (V2). As a result, excessive contraction of liquid (50) after generation of the discharge is suppressed by using maintaining voltage (V2) to thereby lower the possibility of sound produced by vibration of liquid (50). Accordingly, voltage application device (1, 1A) offers an advantage of reduction of sound produced by vibration of liquid (50).

In voltage application device (1, 1A) according to a second aspect, liquid (50) in the first aspect may vibrate mechanically according to a discharge cycle. Magnitude (β) of a voltage applied to load (4) at second time point (t2) immediately after liquid (50) is fully expanded may be more than or equal to ⅔ of magnitude (α) of a voltage applied to load (4) at first time point (t1) at which a discharge is generated.

According to this aspect, magnitude (β) of the voltage at second time point (t2) immediately after the full expansion of liquid 50 as described above has certain relative magnitude with respect to magnitude (α) of the voltage at first time point (t1). In this case, contraction of liquid (50) produced by surface tension or the like can be delayed.

In voltage application device (1, 1A) according to a third aspect, a discharge frequency of discharge electrode (41) in the second aspect may be 600 Hz or more and 5000 Hz or less.

According to this aspect, sound particularly in an audible range can be reduced in sound produced by the vibration of liquid (50).

In voltage application device (1, 1A) according to a fourth aspect, second time point (t2) in either the second aspect or the third aspect may be a time after an elapse of a time of 1/10 of discharge cycle (T1) from first time point (t1).

According to this aspect, second time point (t2) can be set immediately after liquid (50) is fully expanded without monitoring expansion and contraction of liquid (50).

Voltage application device (1, 1A) according to a fifth aspect may apply maintaining voltage (V2) to load (4) to reduce a sound pressure associated with mechanical vibration of liquid (50) by more than or equal to 1 dB in any one of the first to fourth aspects.

According to this aspect, the sound pressure associated with the mechanical vibration of liquid (50) can be sufficiently reduced.

In voltage application device (1, 1A) according to a sixth aspect, liquid (50) may be electrostatically atomized by a discharge in any one of the first to fifth aspects.

According to this aspect, a charged fine particle liquid containing radicals is generated. Therefore, lives of radicals can be elongated as compared with a case where radicals are released into the air as single substances Moreover, when the charged fine particle liquid has a nanometer size, for example, the charged fine particle liquid can be suspended in a relatively wide range.

Discharge device (10, 10A) according to a seventh aspect includes discharge electrode (41) and voltage application circuit (2). Discharge electrode (41) holds liquid (50). Voltage application circuit (2) causes discharge electrode (41) to generate a discharge by applying application voltage (V1) to load (4) including discharge electrode (41). Voltage application circuit (2) periodically changes a magnitude of application voltage (V1) to generate a discharge intermittently. Voltage application circuit (2) applies maintaining voltage (V2) to load (4) for suppressing contraction of liquid (50) in addition to application voltage (V1) during intermittent period (T2) from a discharge to a next discharge.

According to this aspect, maintaining voltage (V2) is applied to load (4) in addition to application voltage (V1) in intermittent period (T2). Accordingly, the voltage applied to load (4) is raised by the amount of maintaining voltage (V2). As a result, excessive contraction of liquid (50) after generation of the discharge is suppressed by using maintaining voltage (V2) to thereby lower the possibility of sound produced by vibration of liquid (50). Accordingly, discharge device (10, 10A) offers an advantage of reduction of sound produced by vibration of liquid (50).

Discharge device (10, 10A) according to an eighth aspect may further include liquid supply unit (5) for supplying liquid (50) to discharge electrode (41) in the seventh aspect.

According to this aspect, liquid (50) is automatically supplied to discharge electrode (41) by liquid supply unit (5). Accordingly, the necessity of work for supplying liquid (50) to discharge electrode (41) is eliminated.

Discharge device (10, 10A) according to a ninth aspect may further include supply amount adjustor (8) that adjusts a supply amount of liquid (50) from liquid supply unit (5) in the eighth aspect.

According to this aspect, the amount of liquid (50) supplied to discharge electrode (41) can be appropriately adjusted. Therefore, an increase in a sound pressure resulting from an inappropriate amount of liquid (50) held by discharge electrode (41) can be suppressed.

Discharge device (10, 10A) according to a tenth aspect may further include counter electrode (42, 42A, 42B, 42C, 42D) disposed so as to face discharge electrode (41) with a clearance in any one of the seventh to ninth aspects. A voltage may be applied between discharge electrode (41) and counter electrode (42, 42A, 42B, 42C, 42D) to generate a discharge between discharge electrode (41) and counter electrode (42, 42A. 42B, 42C, 42D).

According to this aspect, a discharge path through which a discharge current flows can be stably formed between discharge electrode (41) and counter electrode (42, 42A, 42B, 42C, 42D).

The configurations according to the second to sixth aspects are not essential configurations for voltage application device (1, 1A), but may be omitted as appropriate. The configurations according to the eighth to tenth aspects are not essential configurations for discharge device (10, 10A), but may be omitted as appropriate.

INDUSTRIAL APPLICABILITY

The voltage application device and the discharge device are applicable to various applications such as refrigerators, washing machines, dryers, air conditioners, electric fans, air purifiers, humidifiers, facial equipment, and automobiles.

REFERENCE MARKS IN THE DRAWINGS 1, 1A: voltage application device
2: voltage application circuit
4: load
5: liquid supply unit
8: supply amount adjustor
10,10A: discharge device
41: discharge electrode
42, 42A, 42B, 42C, 42D: counter electrode
50: liquid
T1: cycle of discharge (discharge cycle)
T2: intermittent period
V1: application voltage
V2: maintaining voltage
α, β: magnitude of voltage
t1: first time point
t2: second time point

The invention claimed is:

1. A voltage application device comprising
a voltage application circuit that causes a discharge electrode to generate a discharge by applying an application voltage to a load including the discharge electrode for holding a liquid, wherein:
the voltage application circuit repeatedly changes a magnitude of the application voltage to intermittently generate the discharge with a discharge cycle,
within one discharge cycle in which the application voltage has a highest value at a first time point t1 and a lowest value at a third time point t3, the voltage application circuit decreases the application voltage from the highest value to the lowest value,
a magnitude of the application voltage at a second time point t2 is smaller than the highest value and more than or equal to ⅔ of the highest value, where the second time point t2 is a time point after an elapse of a time of 1/10 of the one discharge cycle from the first time point t1, and
after the one discharge cycle ends, the magnitude of the application voltage returns to the highest value from the third time point t3, where a time period between the first time point t1 and the third time point t3 is smaller than the one discharge cycle.

2. The voltage application device according to claim 1, wherein a discharge frequency of the discharge electrode ranges from 600 Hz to 5000 Hz, inclusive.

3. The voltage application device according to claim 1, wherein the liquid is electrostatically atomized by the discharge.

4. A discharge device comprising:
a discharge electrode that holds a liquid; and
a voltage application circuit that causes the discharge electrode to generate a discharge by applying an application voltage to a load including the discharge electrode, wherein:
the voltage application circuit repeatedly changes a magnitude of the application voltage to intermittently generate the discharge with a discharge cycle, and
within one discharge cycle in which the application voltage has a highest value a at a first time point t1 and a lowest value at a third time point t3, the voltage application circuit decreases the application voltage from the highest value a to the lowest value,
a magnitude of the application voltage at a second time point t2 is smaller than the highest value and more than or equal to ⅔ of the highest value a, where the second time point t2 is a time point after an elapse of a time of 1/10 of the one discharge cycle from the first time point t1, and
after the one discharge cycle ends, the magnitude of the application voltage returns to the highest value from the third time point t3, where a time period between the first time point t1 and the third time point t3 is smaller than the one discharge cycle.

5. The discharge device according to claim 4, further comprising a liquid supply unit that supplies the liquid to the discharge electrode.

6. The discharge device according to claim 5, further comprising a supply amount adjustor that adjusts a supply amount of the liquid from the liquid supply unit.

7. The discharge device according to claim 4, further comprising a counter electrode disposed so as to face the discharge electrode via a clearance, wherein the discharge is generated between the discharge electrode and the counter electrode by applying a voltage between the discharge electrode and the counter electrode.

8. The discharge device according to claim 4, further comprising a cooling device configured to cool the discharge electrode and to generate dew condensation water as the liquid.

9. A discharge device comprising:

a discharge electrode that holds a liquid; and a voltage application circuit that causes the discharge electrode to generate a discharge by applying an application voltage to a load including the discharge electrode, wherein:

the voltage application circuit repeatedly changes a magnitude of the application voltage to intermittently generate the discharge with a discharge cycle, within one discharge cycle in which the application voltage has a highest value at a first time point t1 and a lowest value at a third time point t3, the voltage application circuit decreases the application voltage from the highest value to the lowest value with multiple steps, and after the one discharge cycle ends, the magnitude of the application voltage returns to the highest value from the third time point t3, where a time period between the first time point t1 and the third time point t3 is smaller than the one discharge cycle.

10. The discharge device according to claim 9, wherein a magnitude of the application voltage at a second time point t2 is smaller than the highest value and more than or equal to ⅔ of the highest value, where the second time point t2 is a time point after an elapse of a time of $1/10$ of the one discharge cycle from the first time point t1.

* * * * *